(12) United States Patent
Paranjape et al.

(10) Patent No.: US 11,849,279 B2
(45) Date of Patent: Dec. 19, 2023

(54) HAPTICS AND MICROPHONE DISPLAY INTEGRATION

(71) Applicant: Intel Corporation, Santa Clara, CA (US)

(72) Inventors: Vivek Paranjape, Portland, OR (US); Satish Prathaban, Beaverton, OR (US); Vishal Ravindra Sinha, Portland, OR (US); Ramon C. Cancel Olmo, Hillsboro, OR (US); Kunjal S. Parikh, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 121 days.

(21) Appl. No.: 17/235,839

(22) Filed: Apr. 20, 2021

(65) Prior Publication Data

US 2021/0258686 A1 Aug. 19, 2021

Related U.S. Application Data

(63) Continuation of application No. 16/729,353, filed on Dec. 28, 2019, now Pat. No. 11,076,225.

(51) Int. Cl.
| | | |
|---|---|---|
| *H04R 3/00* | (2006.01) | |
| *H04R 1/40* | (2006.01) | |
| *G10L 15/22* | (2006.01) | |
| *G10L 15/08* | (2006.01) | |
| *G10L 25/78* | (2013.01) | |
| *H04R 1/02* | (2006.01) | |

(52) U.S. Cl.
CPC ............. *H04R 1/406* (2013.01); *G10L 15/08* (2013.01); *G10L 15/22* (2013.01); *G10L 25/78* (2013.01); *H04R 1/028* (2013.01); *H04R 3/005* (2013.01); *G10L 2015/088* (2013.01); *H04R 2201/401* (2013.01); *H04R 2499/15* (2013.01)

(58) Field of Classification Search
CPC ........ H04R 1/406; H04R 1/028; H04R 3/005; G10L 15/08; G10L 15/22; G10L 25/78
See application file for complete search history.

(56) References Cited

U.S. PATENT DOCUMENTS

| | | |
|---|---|---|
| 8,879,766 B1 | 11/2014 | Zhang |
| 9,424,456 B1 | 8/2016 | Koteshwara et al. |
| (Continued) | | |

*Primary Examiner* — Simon King
(74) *Attorney, Agent, or Firm* — Alliance IP, LLC

(57) ABSTRACT

Microphones are located between pixel display elements (e.g., micro-LEDs and OLEDs) in a display. Display-integrated microphones allow displays to have thinner bezels. Audio processing components can also be incorporated into the display and allow audio processing offloading from processors external to the display. Arrays of microphones allow for the beamforming of received audio signals to enhance the detection of sound from remote audio sources. Piezoelectric elements can also be integrated into a display to allow for localized haptic feedback. Integrated piezoelectric elements can act as speakers and beamforming techniques can be used to activate sets of piezoelectric elements in coordination to direct sound to a specific location external to the display. Piezoelectric elements can aid in display thermal management by creating acoustic waves to move heated air within a display to create a more uniform thermal profile within the display or to remove excess heat from the display.

16 Claims, 12 Drawing Sheets

(56) References Cited

U.S. PATENT DOCUMENTS

| | | |
|---|---|---|
| 2002/0080684 A1 | 6/2002 | Donskoy et al. |
| 2005/0203749 A1 | 9/2005 | Miyata |
| 2008/0111765 A1 | 5/2008 | Kim |
| 2010/0084661 A1 | 4/2010 | Hwang |
| 2013/0051587 A1 | 2/2013 | Stephanou et al. |
| 2013/0057718 A1 | 3/2013 | Tateishi et al. |
| 2013/0106868 A1 | 5/2013 | Shenoy |
| 2014/0078154 A1 | 3/2014 | Payne et al. |
| 2014/0111689 A1 | 4/2014 | Kim et al. |
| 2014/0192061 A1 | 7/2014 | Payne et al. |
| 2014/0219471 A1 | 8/2014 | Deshpande et al. |
| 2014/0239802 A1 | 8/2014 | Lee et al. |
| 2015/0091795 A1 | 4/2015 | Kang et al. |
| 2015/0124980 A1 | 5/2015 | Vilermo et al. |
| 2015/0160771 A1* | 6/2015 | Takeuchi ............... G06F 3/041 345/177 |
| 2015/0205331 A1 | 7/2015 | McClintock et al. |
| 2016/0031700 A1 | 2/2016 | Sparks et al. |
| 2017/0242478 A1 | 8/2017 | Ma |
| 2017/0280108 A1 | 9/2017 | Matsumoto et al. |
| 2019/0102046 A1* | 4/2019 | Miranto ............... B06B 1/0622 |
| 2019/0197666 A1 | 6/2019 | Oikkonen et al. |
| 2019/0370518 A1* | 12/2019 | Maor ..................... A61B 8/02 |
| 2020/0122196 A1* | 4/2020 | Kobrin ................. B06B 1/0629 |
| 2020/0156108 A1* | 5/2020 | Zhao .................... B06B 1/0607 |
| 2020/0160018 A1* | 5/2020 | Panchawagh ........ H10N 30/857 |
| 2020/0162099 A1 | 5/2020 | Perrott |
| 2020/0234021 A1* | 7/2020 | Lu ...................... G06V 40/1306 |
| 2020/0279087 A1* | 9/2020 | Seo .................... G01S 7/52079 |
| 2020/0402439 A1 | 12/2020 | Shu et al. |
| 2021/0117519 A1* | 4/2021 | Yoon ................. G06V 40/1306 |
| 2021/0223882 A1* | 7/2021 | Ding .................... G06F 3/0446 |
| 2021/0330547 A1* | 10/2021 | Moaddeb ............. A61N 1/0456 |

\* cited by examiner

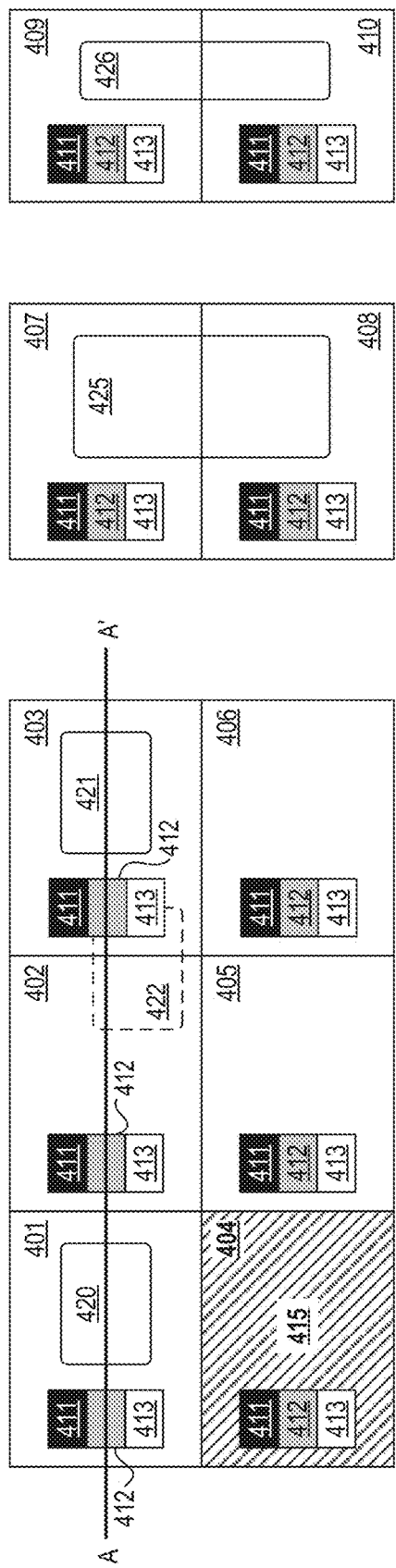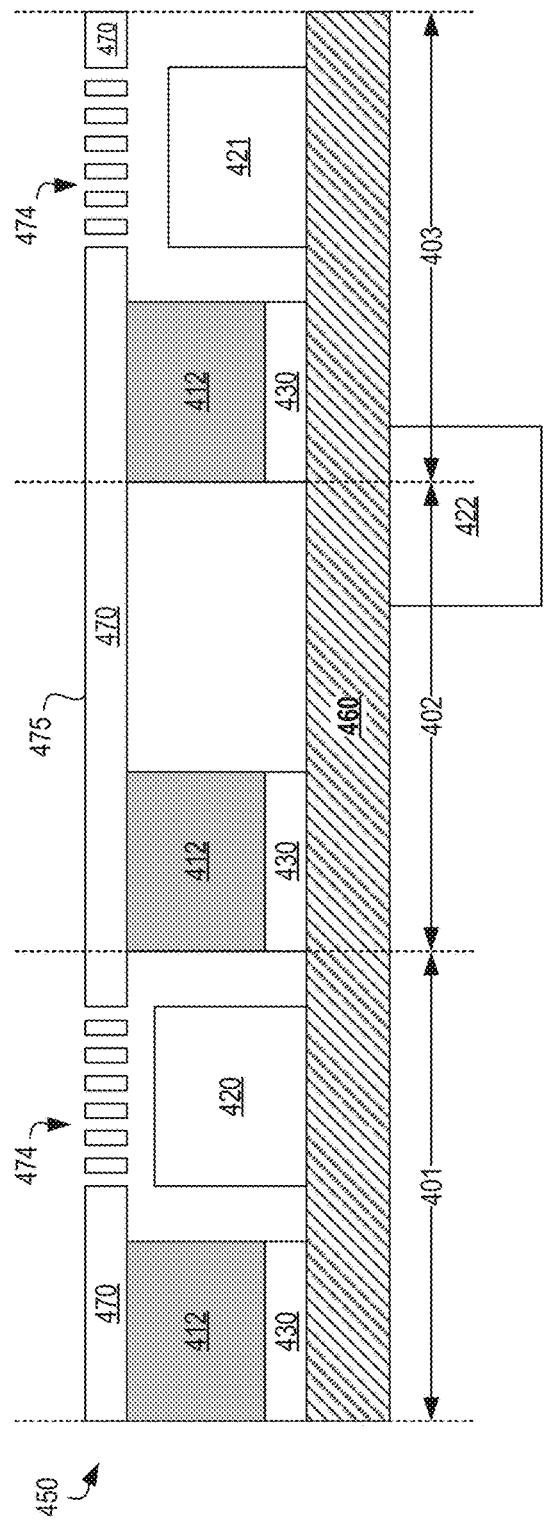
FIG. 4A FIG. 4B FIG. 4C FIG. 4D

500

DETERMINE AUDIO SOURCE LOCATION BASED ON MICROPHONE AUDIO SIGNALS
510

SELECT SUBSET OF MICROPHONES BASED ON AUDIO SOURCE LOCATION
520

UTILIZE AUDIO SIGNALS CORRESPONDING TO SUBSET OF MICROPHONES TO ENHANCE DETECTION OF SOUND RECEIVED AT DISPLAY FROM AUDIO SOURCE
530

FIG. 5

HAPTICS AND MICROPHONE DISPLAY INTEGRATION

CROSS-REFERENCE TO RELATED APPLICATIONS

This application is a continuation (and claims the benefit of priority under 35 U.S.C. § 120) of U.S. application Ser. No. 16/729,353, filed on Dec. 28, 2019 and entitled HAPTICS AND MICROPHONE DISPLAY INTEGRATION. The disclosure of the prior application is considered part of and is hereby incorporated by reference in its entirety in the disclosure of this application.

BACKGROUND

Microphones are commonly incorporated into mobile computing devices. Laptops, notebooks, and mobile devices with similar form factors typically have one or a small number of microphones located in the bezel of the display housing. These microphones are typically discrete in nature, mounted on a dedicated substrate, and use discrete wires to connect to audio processors located external to the display. Touch capabilities are also commonplace in mobile computing devices. Mobile devices can detect the touch of a user's finger or other objects on a display and determine where the touch occurred on the display. Some mobile devices also possess haptic capabilities that cause the device to vibrate in response to various events.

BRIEF DESCRIPTION OF THE DRAWINGS

FIG. 4A illustrates a set of exemplary pixels with integrated microphones.

FIG. 4B illustrates a cross-section of the exemplary pixels of FIG. 4A taken along the line A-A'.

FIGS. 4C-4D illustrate exemplary microphones that span multiple pixels.

FIG. 5 illustrates an exemplary method for enhancing the audio detection capabilities of a display.

DETAILED DESCRIPTION

Figure 1:
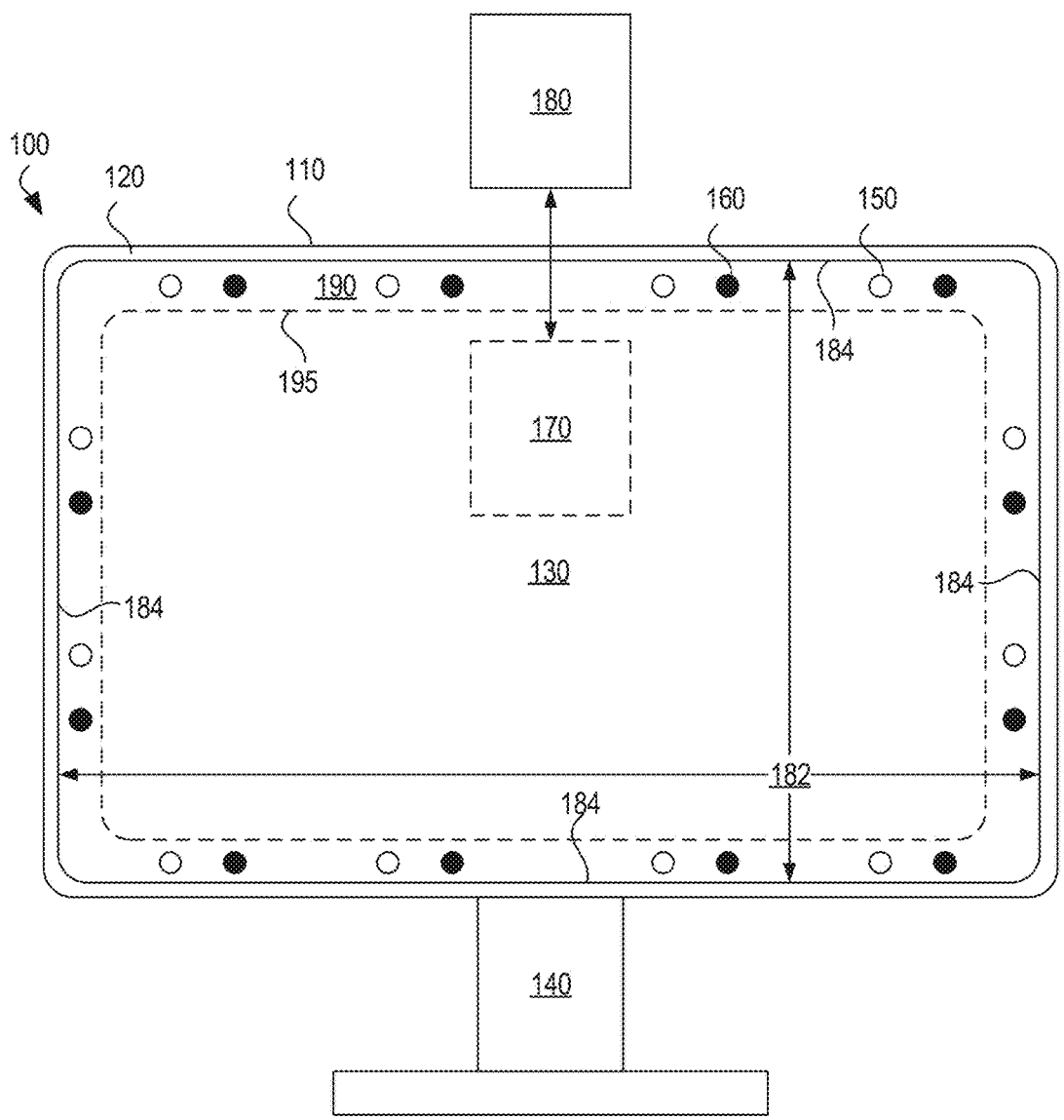
FIG. 1 illustrates an exemplary display.

Mobile device sensors are typically limited to where they can be placed and how many of a particular type of sensor can be placed in a device. For example, laptop and notebook microphones are typically placed in the bezel of the display and are usually limited to one to four in number. The low number of microphones and constraints on their placement limits the audio capabilities of these devices. For example, having only a few microphones limits far-field audio capabilities. Further, since the microphones are typically integrated into the front-facing surface of the bezel, the microphones are positioned up against the base of the device when the device is closed, meaning the closed device typically has no or very limited audio capabilities. To include more microphones in these devices may enable increased audio functionality but would likely do so at the expense of an increased bezel width, which can impact device aesthetics. Adding more microphones in the bezel may also increase system complexity and cost due to the routing of additional audio signals from the microphones to audio processing components located external to the display.

The size of the display elements responsible for generating light in a display pixel or allowing for the transmission of light through each pixel continues to shrink over time. Even at the higher resolutions used in existing consumer electronics displays (e.g., 1920×1080 (Full HD), 3840×2160 (4K HD)), display elements can take up only a portion of the area of a pixel. If the black matrix area of a display (the area of the front side of the display substrate not occupied by display elements) has enough unused space, additional elements, such as microphones, can be incorporated into individual pixels. Moving microphones from the display bezel to the display area allows for a reduced bezel width and for many microphones to be incorporated into a display. A larger number of microphones in a device can allow for improved audio detection, noise reduction, and far-field capabilities. Microphones located on a display substrate can be located in the display bezel if the display substrate extends into the bezel area. Such microphones also allow for a reduced bezel relative to bezels housing discrete microphones.

The incorporation of additional sensors, such as rear-facing microphones and piezoelectric elements, allows for additional display functionalities. If incorporated into a laptop display, rear-facing microphones can provide audio detection capabilities when the laptop is closed. Piezoelectric elements incorporated into a display allow for improved haptic capabilities in a device. For example, when combined with a touchscreen, piezoelectric elements incorporated into a display can provide localized haptic feedback to a user, which can allow for an improved user experience.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or in any other manner. "Connected" may indicate elements are in direct physical or electrical contact with each other and "coupled" may indicate elements co-operate or interact with each other, but they may or may not be in direct physical or electrical contact. Terms modified by the word "substantially" include arrangements, orientations, spacings or positions that vary slightly from the meaning of the unmodified term. For example, a microphone located substantially at the center of a display includes microphones located within a few pixels of the center of the display.

The description may use the phrases "in an embodiment," "in embodiments," "in some embodiments," and "in various embodiments," each of which may refer to one or more of the same or different embodiments. Furthermore, the terms "comprising," "including," "having," and the like, as used with respect to embodiments of the present disclosure, are synonymous.

Reference is now made to the drawings, wherein similar or same numbers may be used to designate the same or similar parts in different figures. The use of similar or same numbers in different figures does not mean all figures including similar or same numbers constitute a single or same embodiment. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

Microphones

FIG. 1 illustrates an exemplary display. The display 100 comprises a housing 110, a bezel 120, a display surface 130, and a display base 140. Located within the display area are front-facing microphones 150 (white circles), rear-facing microphones 160 (dark circles), and one or more audio processing components 170. The audio processing components 170 are electrically coupled to one or more external processors 180. The display 100 can be any type of display in which the display elements responsible for generating light or allowing for the transmission of light are located at each pixel. Such displays include TFT LCD (thin-film-transistor liquid crystal display), micro-LED (micro-light emitting diode), OLED (organic LED), and QLED (quantum dot LED) displays. The housing 110 comprises the bezel 120, which borders the display surface 130. Display 100 comprises a display substrate (not shown in FIG. 1) on which a plurality of pixels (also not shown) is located. The pixels define a display area 182 within which images, videos, and other content can be displayed. In display 100, the pixels extend to interior edges 184 of the bezel 120 and the display area 182 thus extends from one interior bezel edge 184 to the opposite bezel edge 184 in both the horizontal and vertical directions. The front-facing microphones 150 are located on the front side of the display substrate and within the display area and the rear-facing microphones 160 are located on the back side of the display substrate. Being located on the front side of the display substrate, the front-facing microphones 150 share real estate with the pixel display elements, as will be discussed in greater detail below.

The front-facing microphones 150 are located within a peripheral region 190 of the display area, the boundary of which is represented by dashed line 195. The peripheral region 190 is not defined as a set distance from the edge of the bezel 120 but is rather defined generally as the region of the display area near the bezel 120. As small holes may be made on the surface of the display 100 where the front-facing microphones 150 are located to allow acoustic vibrations to reach the front-facing microphones 150, locating the front-facing microphones 150 in the peripheral area 190 of the display 100 may create a more pleasant user experience. However, the presence of small holes in a display does not limit the location of front-facing microphones to the periphery of a display; front-facing microphones can be placed at any location within a display area.

Figure 2A:
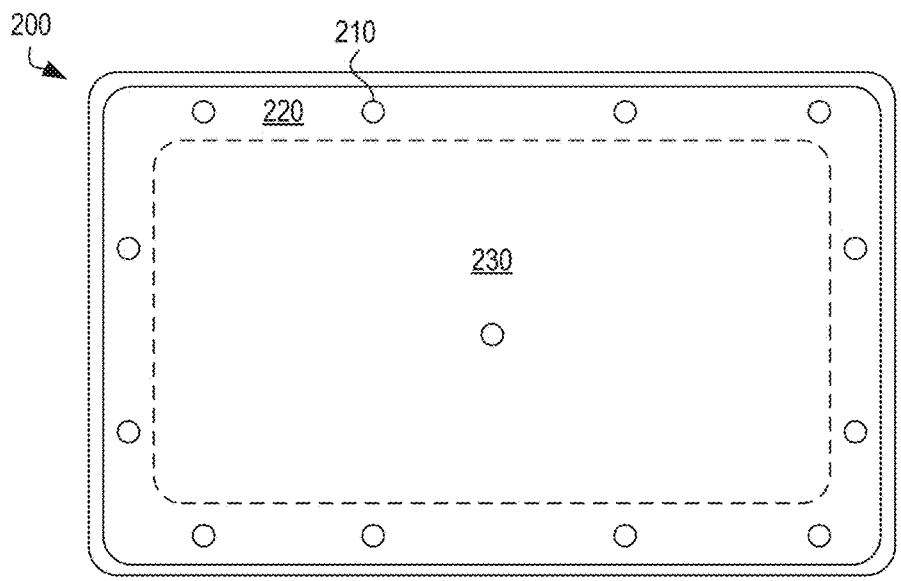
FIGS. 2A-2C illustrate exemplary arrangements of front-facing microphones in a display.
Figure 2B:
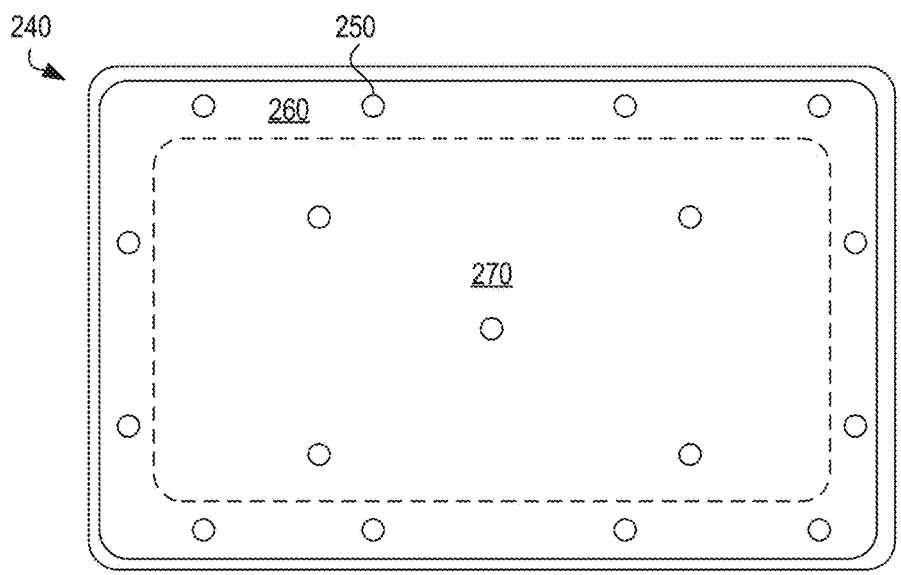
Figure 2C:
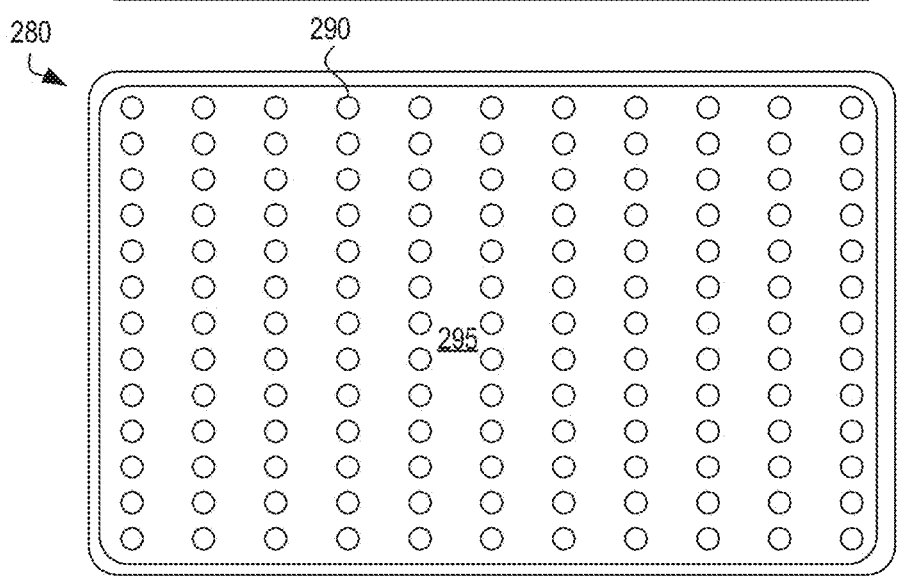

FIGS. 2A-2C illustrate exemplary arrangements of front-facing microphones in a display. FIG. 2A illustrates a display 200 in which front-facing microphones 210 include a set of microphones located in peripheral region 220 of a display area 230 and a microphone located substantially in the center of the display area 230. FIG. 2B illustrates a display 240 in which front-facing microphones 250 include a set of microphones located in peripheral region 260 of display area 270 and a set of microphones located outside the peripheral region 260 of the display area 270. FIG. 2C illustrates a display 280 in which an array of front-facing microphones 290 are within display area 295 of the display 280. In other embodiments, a display can have a plurality of front-facing microphones that vary in number and arrangement from the exemplary configurations shown in FIGS. 1 and 2A-2C.

Returning to FIG. 1, the one or more audio processing components 170 can comprise, for example, analog-to-digital converters, audio codecs, and digital signal processors (DSPs). The audio processing components are electrically coupled to front-facing microphones 150 and rear-facing microphones 160. Although display 100 is shown comprising both front- and rear-facing microphones, in some embodiments a display has only front-facing microphones and in other embodiments a display has only rear-facing microphones. In embodiments comprising both front- and rear-facing microphones, the microphones can be electrically coupled to the same audio processing components. In other embodiments, the front-facing microphones can be electrically coupled to a first set of audio processing components and the rear-facing microphones can be electrically coupled to a second set of audio processing components. The analog-to-digital converters and audio codecs can convert analog audio signals received from the microphones to digital analog signals, and the DSPs can process the digital signals. In some embodiments, the DSPs can perform various audio-related functions such as voice activity detection, key phrase detection, and audio speech recognition. Voice activity detection functionality detects the presence of human speech in audio signals. Key phrase detection detects the presence of a word or phrase that causes one or more of the audio processing components or processors electrically coupled to the audio processing components (such as external processor 180) to transition from a low-power state to an active state. Audio speech recognition is one audio-related function that can be enabled in an active state and allows for the recognition and translation of spoken language into text or commands. In some embodiments, audio speech recognition can cause a display or system to wake from a low-power state upon detection of any spoken words, not just a specific word or phrase.

As the audio processing components 170 can perform audio processing typically performed by processing resources external to the display in existing devices, the audio processing components 170 allow for the offloading of audio processing. Offloading audio processing from processors external to the display can reduce the power consumption of the external processors, which can be of value if the external processor is in a mobile device operating on battery power. Moving audio processing components from external processors to the display, where they are closer to the microphones, can also provide latency improvements.

The audio processing components can also perform noise reduction. Noise reduction can be improved in displays with multiple integrated microphones distributed across a display as there are more audio signals provided by spatially diverse microphones to use in noise reduction approaches. In some embodiments, the DSPs perform noise reduction, conduct beamforming with multiple microphones to enhance voice detection capabilities, detect the direction of a voice or other noise source and act to enhance audio reception. DSPs can also provide spatiality (i.e., the location or direction of an audio source) and other features to an audio signal which can enhance the user experience when the associated sound is reproduced.

The audio processing components 170 are communicatively coupled to one or more processors 180 located external to the display 100. The display 100 is shown as a stand-alone display and as such the one or more audio processing components 170 can be in wired or wireless communication with one or more central processor units (CPUs), graphic processing units (GPUs), or systems-on-a-chip (SOCs) located in a laptop, tablet, smart phone, desktop, workstation or other computing device. In other embodiments, the display 100 is integrated into a mobile device such as a smartphone, tablet, mobile gaming system and the audio processing components 170 are in communication with processors incorporated within the mobile device. In still other embodiments, the display 100 can be an embedded display such as in an in-vehicle infotainment (IVI) system, a kiosk, or in any other of a wide variety of consumer or commercial electronic devices, such as television sets, commercial display installations (trade shows, stadiums, shopping malls, etc.), and navigation systems.

In some embodiments, additional processors or devices can be incorporated into the display to support additional function. For example, wireless communication functionality can be incorporated into the display to allow for audio processing components to offload audio processing, such as audio speech recognition, to a remote server or cloud-based service.

Figure 3A:
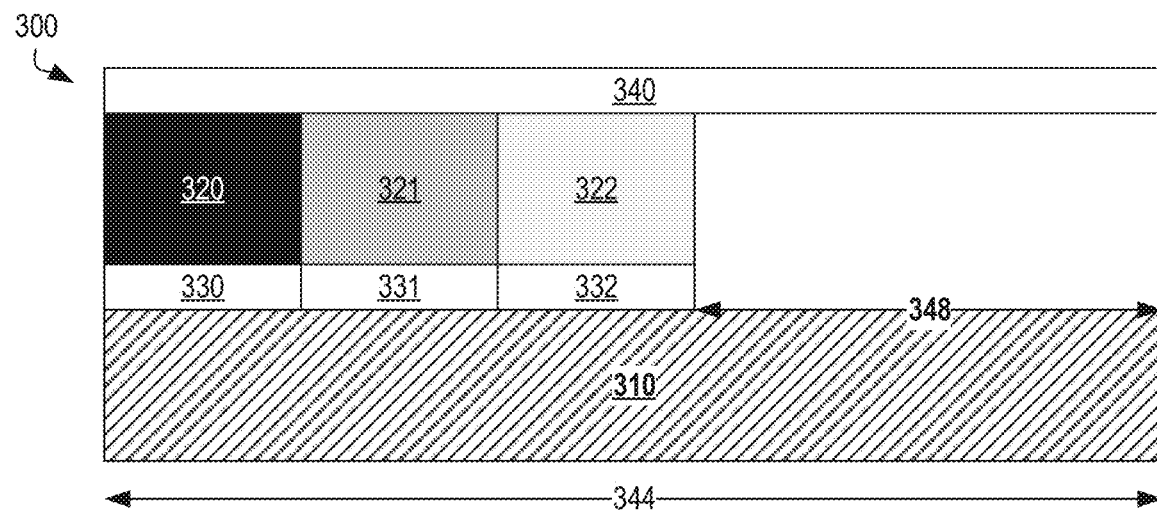
FIGS. 3A-3B illustrate simplified cross-sections of exemplary pixels in displays.
Figure 3B:
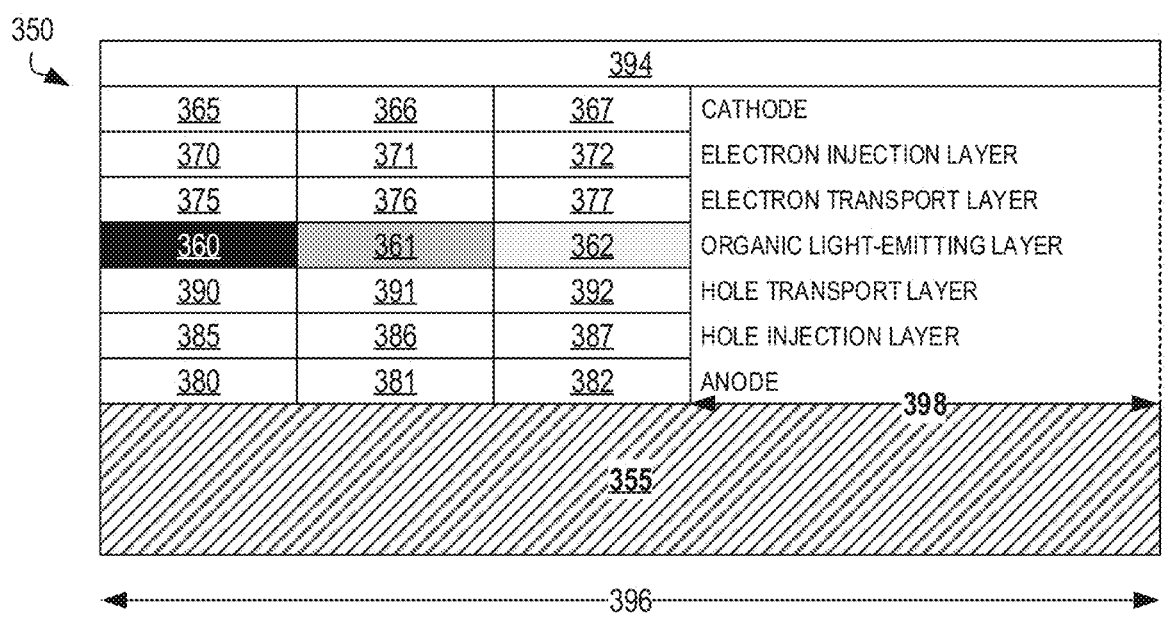

FIGS. 3A-3B illustrate simplified cross-sections of pixels in exemplary displays. FIG. 3A is a simplified illustration of the cross-section of a pixel in an exemplary micro-LED display. Micro-LED pixel 300 comprises a display substrate 310, a red LED 320, a green LED 321, a blue LED 322, electrodes 330-332, and a transparent display medium 340. The LEDs 320-322 are the individual light-producing elements for the pixel 300, with the amount of light produced by each LED 320-322 being controlled by the associated electrode 330-332.

The LED stacks (red LED stack (layers 320 and 330), green LED stack (layers 321 and 331) and blue LED stack (layers 322 and 332)) can be manufactured on a substrate using microelectronic manufacturing technologies. In some embodiments, the display substrate 310 is a substrate different from the substrate upon which the LEDs stacks are manufactured and the LED stacks are transferred from the manufacturing substrate to the display substrate 310. In other embodiments, the LED stacks are grown directly on the display substrate 310. In both embodiments, multiple pixels can be located on a single display substrate and multiple display substrates can be assembled to achieve a display of a desired size.

The pixel 300 has a pixel width 344, which can depend on, for example, display resolution and display size. For example, for a given display resolution, the pixel width 344 can increase with display size. For a given display size, the pixel width 344 can decrease with increased resolution. The pixel 300 has an unused pixel area 348, which is part of the black matrix area of a display. In some displays, the combination of LED size, display size, and display resolution can be such that the unused pixel area 348 can be large enough to accommodate the integration of components, such as microphones, within a pixel.

FIG. 3B is a simplified illustration of the cross-section of a pixel in an exemplary OLED display. OLED pixel 350 comprises a display substrate 355, organic light-emitting layers 360-362, which are capable of producing red (layer 360), green (layer 361) and blue (layer 362) light, respectively. The OLED pixel 350 further comprises cathode layers 365-367, electron injection layers 370-372, electron transport layers 375-377, anode layers 380-382, hole injections layers 385-387, hole transport layers 390-392, and a transparent display medium 394. The OLED pixel 350 generates light through application of a voltage across the cathode layers 365-367 and anode layers 380-382, which results in the injection of electrons and holes into electron injection layers 370-372 and hole injection layers 384-386, respectively. The injected electrons and holes traverse the electron transport layers 375-377 and hole transport layers 390-392, respectively, and electron-hole pairs recombine in the organic light-emitting layers 360-362 to generate light.

Similar to the LED stacks in micro-LED displays, OLED stacks (red OLED stack (layers 365, 370, 375, 360, 390, 385, 380), green OLED stack (layers 366, 371, 376, 361, 391, 386, 381), and blue OLED stack (layers 367, 372, 377, 362, 392, 386, 382), can be manufactured on a substrate separate from the display substrate 355. In some embodiments, the display substrate 355 is a substrate different from the substrate upon which the OLED stacks are transferred from the manufacturing substrate to the display substrate 355. In other embodiments, the OLED stacks are directly grown on the display substrate 355. In both types of embodiments, multiple display substrate components may need to be assembled in order to achieve a desired display size. The transparent display mediums 340 and 394 can be any transparent medium such as glass, plastic or a film. In some embodiments, the transparent display medium can comprise a touchscreen.

Again, similar to the micro-LED pixel 300, the OLED pixel 350 has a pixel width 396 that can depend on factors such as display resolution and display size. The OLED pixel 350 has an unused pixel area 398 and in some displays, the combination of OLED stack widths, display size, and display resolution can be such that the unused pixel area 398 is large enough to accommodate the integration of components, such as microphones, within a pixel.

As used herein, the term "display substrate" can refer to any substrate used in a display and upon which pixel display elements are manufactured or placed. For example, the display substrate can be a backplane manufactured separately from the pixel display elements (e.g., micro-LED/OLEDs in pixels 300 and 350) and upon which pixel display elements are attached, or a substrate upon which pixel display elements are manufactured.

FIG. 4A illustrates a set of exemplary pixels with integrated microphones. Pixels 401-406 each have a red display element 411, green display element 412, and blue display element 413, which can be, for example, micro-LEDs or OLEDs. Each of the pixels 401-406 occupies a pixel area. For example, the pixel 404 occupies pixel area 415. The amount of pixel area occupied by the display elements 411-413 in each pixel leaves enough remaining black matrix space for the inclusion of miniature microphones. Pixels 401 and 403 contain front-facing microphones 420 and 421, respectively, located alongside the display elements 411-413. As rear-facing microphones are located on the back side of the display substrate, they are not constrained by unused pixel area or display element size and can be placed anywhere on the back side of a display substrate. For example, rear-facing microphone 422 straddles pixels 402, 403, 405, and 406.

FIG. 4B illustrates a cross-section of the exemplary pixels of FIG. 4A taken along the line A-A'. Cross-section 450 illustrates the cross-section of pixels 401-403. Red display elements 412 and corresponding electrodes 430 for the pixels 401-403 are located on display substrate 460. The pixels 401-403 are covered by transparent display medium 470 that has holes 474 above microphones 420 and 421 to allow for acoustic vibrations reaching a display surface 475 to reach the microphones 420 and 421. The rear-facing microphone 422 is located on the back side of the display substrate 460. In some embodiments, a display housing (not shown) in which pixels 401-403 are located has vents or other openings to allow acoustic vibrations reaching the back side of the housing to reach rear-facing microphone 422.

In some embodiments, the microphones used in the technologies described herein can be discrete microphones that are manufactured or fabricated independently from the pixel display elements and are transferred from a manufacturing substrate or otherwise attached to a display substrate. In other embodiments, the microphones can be fabricated directly on the display substrate. Although front-facing microphones are shown as being located on the surface of the display substrate 460 in FIG. 4B, in embodiments where the microphones are fabricated on a display substrate, they can reside at least partially within the display substrate.

As used herein, the term "located on" in reference to any sensors (microphones, piezoelectric elements, thermal sensors) with respect to the display substrate refers to sensors that are physically coupled to the display substrate in any manner (e.g., discrete sensors that are directly attached to the substrate, discrete sensors that are attached to the substrate via one or more intervening layers, sensors that have been fabricated on the display substrate). As used herein, the term "located on" in reference to LEDs with respect to the display substrate similarly refers to LEDs that are physically coupled to the display substrate in any manner (e.g., discrete LEDs that are directly attached to the substrate, discrete LEDs that are attached to the substrate via one or more intervening layers, LEDs that have been fabricated on the display substrate). In some embodiments, front-facing microphones are located in the peripheral area of a display, such as peripheral area 190 of display 100, to reduce any visual distraction that holes in the display above the front-facing microphones (such as holes 474) may present to a user. In other embodiments, holes above a microphone may small enough or few enough in number such that they present little or no distraction from the viewing experience.

Although the front-facing microphones 420 and 421 are each shown as residing within one pixel, in other embodiments, front-facing microphones can straddle multiple pixels. This can, for example, allow for the integration of larger microphones into a display area or for microphones to be integrated into a display with smaller pixels. FIGS. 4C-4D illustrate exemplary microphones that span multiple pixels. FIG. 4C illustrates adjacent pixels 407 and 408 having the same size as pixels 401-406 and a front-facing microphone 425 that is bigger than front-facing microphones 420-421 and occupies pixel area not used by display elements in two pixels. FIG. 4D illustrates adjacent pixels 409 and 410 that are narrower in width than pixels 401-406 and a front-facing microphone 426 that spans both pixels. Using larger microphones can allow for improved acoustic performance of a display, such as allowing for improved acoustic detection. Displays that have many integrated miniature microphones distributed across the display area can have acoustic detection capabilities that exceed displays having just one or a few discrete microphones located in the display bezel.

In some embodiments, the microphones described herein are MEMS (microelectromechanical systems) microphones. In some embodiments, the microphones generate analog audio signals that are provided to the audio processing components and in other embodiments, the microphones provide digital audio signals to the audio processing components. Microphones generating digital audio signals can contain a local analog-to-digital converter and provide a digital audio output in pulse-density modulation (PDM), I2S (Inter-IC Sound), or other digital audio signal formats. In embodiments where the microphones generate digital audio signals, the audio processing components may not comprise analog-to-digital converters. In some embodiments, the integrated microphones are MEMS PDM microphones having dimensions of approximately 3.5 mm (width)×2.65 mm (length)×0.98 mm (height).

As microphones can be integrated into individual pixels or across several pixels using the technologies described herein, a wide variety of microphone configurations can be incorporated into a display. FIGS. 1, 2A-2C, 3, and 4A-4D show several microphone configurations and many more are possible.

The display-integrated microphones described herein generate audio signals that are sent to one or more audio processing components, such as audio processing component 170 in FIG. 1. The audio processing components are typically located on the back side of the display substrate. In some embodiments, audio signals generated by the microphones are sent to the same one or more audio processing components. In other embodiments, audio signals generated by different sets of microphones are provided to different audio processing components. In some embodiments, front-facing microphones are sent to a first set of audio processing components and rear-facing microphones are sent to a second set of audio processing components. The interconnections providing the audio signals from the microphones to an audio processing component can be located on the display substrate. The interconnections can be fabricated on the display substrate, attached to the display substrate, or physically coupled to the display substrate in any other manner.

In some embodiments, display manufacture comprises manufacturing individual display substrate portions to which pixels are attached and assembling the display substrate portions together to achieve a desired display size. In these embodiments, the interconnections connecting the microphones to the audio processing components can be fabricated as part of the display substrate.

Displays with microphones integrated into the display area as described herein can perform various audio processing tasks. For example, displays in which multiple front-facing microphones are distributed over the display area can perform beamforming or spatial filtering on audio signals generated by the microphones to allow for far-field capabilities (i.e., enhanced detection of sound generated by a remote acoustic source). Audio processing components can determine the location of a remote audio source, select a subset of microphones based on the audio source location, and utilize audio signals from the selected subset of microphones to enhance detection of sound received at the display from the audio source. In some embodiments, the audio processing components can determine the location of an audio source by determining delays to be added to audio signals generated by various combinations of microphones such that the audio signals overlap in time and then inferring the distance to the audio source from each microphone in the combination based on the added delay to each audio signal. By adding the determined delays to the audio signals provided by the microphones, audio detection in the direction of the remote audio source can be enhanced. A subset of the total number of microphones in a display can be used in beamforming or spatial filtering, and microphones not included in the subset can be powered off to reduce power. Beamforming can similarly be performed using rear-facing microphones distributed across the back side of the display substrate. As compared to displays having a few microphones incorporated into a display bezel, displays with microphones integrated into the display area are capable of improved beamforming due to the greater number of microphones that can be integrated into the display and being spread over a greater area.

In some embodiments, a display is configured with a set of rear-facing microphones distributed across the display area that allows for a closeable device incorporating the display (such as a laptop or notebook) to have audio detection capabilities when the display is closed. For example, a closed device can be in a low-power mode in which the rear-facing microphones and audio processing components capable of performing key phrase detection are enabled. The audio processing components wait for the detection of a key phrase to be uttered and wakes the audio processing components (that is, causes them to a high-power mode) to enable a voice interface or other functionalities.

In some embodiments, a display comprising both front- and rear-facing microphones can utilize both types of microphones for noise reduction, enhanced audio detection (far field audio), and enhanced audio recording. For example, if a user is operating a laptop in a noisy environment, such as a coffee shop or cafeteria, audio signals from one or more rear-facing microphones picking up ambient noise can be used to reduce noise in an audio signal provided by a front-facing microphone containing the voice of the laptop user. In another example, an audio recording made by a device containing such a display can include audio received by both front- and rear-facing microphones. By including audio captured by both front- and rear-facing microphones, such a recording can provide a more accurate audio representation of the recorded environment. In further examples, a display comprising both front- and rear-facing microphones can provide for 360-degree far field audio reception. For example, the beamforming or spatial filtering approaches described herein can be applied to audio signals provided by both front- and rear-facing microphones to provide enhanced audio detection.

In some embodiments, information indicating the location or direction of an audio source relative to a display can be included as part of a recording of sound received at one or more microphones incorporated in a display. Audio source location or directional information can be used by an audio playback device capable of generating directional audio playback to generate audio output that reproduces the spatiality of the audio recorded by the audio recording device. In other embodiments, the spatiality of audio received at a device can be captured by recording the audio signals provided by multiple speakers incorporated in the device along with positional information for the multiple speakers. The positional information for the speakers can indicate each speaker's physical location within the display or relative position to other speakers. An audio playback device can reproduce the spatiality of the recorded audio by playing the recorded audio across a set of speakers that have a positional arrangement the same or similar to those used in the recording.

FIG. 5 illustrates an exemplary method for enhancing the audio detection capabilities of a display. The method 500 can be performed by, for example, a laptop display having an array of 24 integrated microphones distributed across the display area, and audio processing components located in the display that is receiving sound generated by a person located ten feet away and off to the right of the display. In 510, an audio source location based at least in part on audio signals corresponding to at least one of the microphones is determined. In the example, the audio processing components in the display determine the location of the person based on audio signals corresponding to a combination of microphones in the display. The audio processing components determine the location of the person by determining the delays to be added to the audio signals such that the audio signals overlap in time and then inferring the distance from each microphone to the person based on the delay added to each signal. In the example, the audio processing components determine that smaller delays need to be added to audio signals provided by microphones located on the right side of the display (located nearer to the person) and that longer delays need to be added to audio signals provided by microphones located on the left side of the display (located further away from the person) for the audio signals to align. Based on the delays the audio processing components add to each audio signal to get them to align, the audio processing components determine that person is located approximately 10 feet away and off to the right from the display.

In 520, a subset of microphones is selected based on the determined audio source location. In the example, the audio processing components determine that a set of 12 microphones located across the display area can provide enhanced detection of sound generated by the person and selects those 12 microphones for enhanced detection of further sound received at the display generated by the person. In 530, audio signals corresponding to the subset of microphones are utilized to enhance the detection of sound received at the display from the audio source. In the example, the audio processing components utilize the audio signals corresponding to the subset of 12 microphones for enhanced detection of sound generated by the person.

In other embodiments, the method 500 can comprise fewer, alternative, or more actions. For example, in some embodiments, the method 500 can further power down the microphones that are not included in the subset of microphones selected for enhanced audio detection.

Thus, displays with integrated microphones located within the display area have advantages over displays with microphones located in a display bezel. Displays with microphones located in the display area can have a narrower bezel as bezel space is not needed for housing the integrated microphones. Displays with reduced bezel width can be more aesthetically pleasing to a viewer and allow for a larger display area within a given display housing size. Opening up the display area for the integration of microphones allows for a greater number of microphones to be included in a device, which can allow for improved audio detection and noise reduction. Moreover, displays that have microphones located across the display area allow for displays with enhanced audio detection capabilities through the use of beamforming or spatial filtering of received audio signals as described above. Further, the cost and complexity of routing audio signals from microphones located in the display area to audio processing components that are also located in the display area can be less than wiring discrete microphones located in a display bezel to audio processing components located external to the display.

Further, the integration of audio processing components in the display allows for the offloading of audio processing from processors external to the display. Offloading of audio processing to the display can be more attractive than other media offloading solutions (e.g., Chromecast) that require extensive ecosystem enabling for applications to use the media offloading.

Piezoelectric elements can also be incorporated into a display. Piezoelectric materials have the property that they create an electric charge when subjected to mechanical stress. This piezoelectric effect allows for the translation of mechanical energy to electrical energy. Piezoelectric materials also exhibit a reverse piezoelectric effect that allows for the conversion of electrical energy to mechanical energy. The reverse piezoelectric effect can be used to create piezoelectric elements, such as piezoelectric speakers or buzzers, that can provide audio output or a haptic signal to a user by applying an alternating voltage across the piezoelectric material.

Figure 6A:
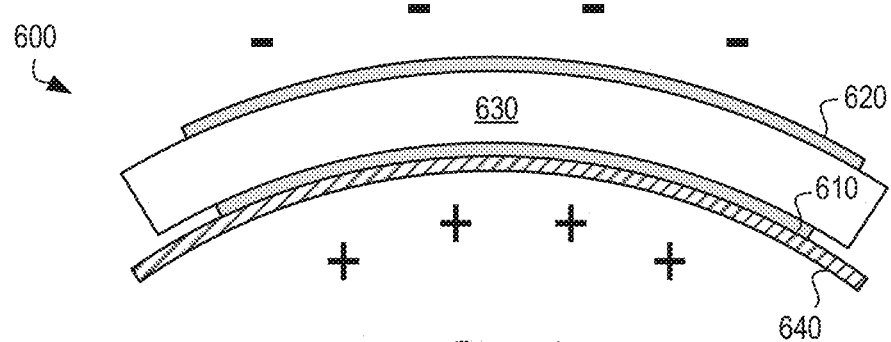
FIGS. 6A and 6B illustrate an exemplary piezoelectric element under various operating conditions.
Figure 6B:
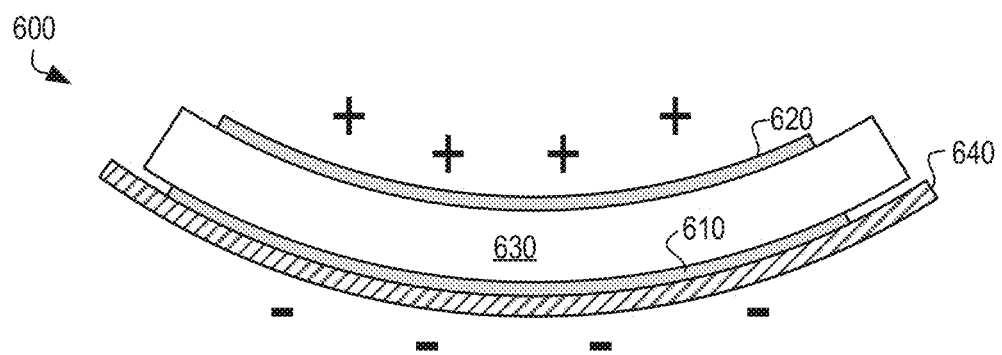

FIGS. 6A and 6B illustrate an exemplary piezoelectric element under various conditions. The piezoelectric element 600 comprises electrodes 610 and 620 on either side of a piezoelectric layer 630, and a diaphragm 640. Application of a voltage differential across the piezoelectric layer 630 causes deformation of the piezoelectric layer 630 (FIG. 6A) in a first direction and reversing the polarity of the applied voltage differential causes deformation in the opposite direction (FIG. 6B). The amounts of deformation shown in FIGS. 6A and 6B are exaggerated to illustrate the piezoelectric effect and are not representative of the amount of deformation that can occur in a piezoelectric element. In practical applications, a piezoelectric element may deform less than shown in FIGS. 6A and 6B.

The diaphragm 640 amplifies piezoelectric element vibrations. In some embodiments diaphragm 640 is a metal plate. If an alternating voltage is applied across the piezoelectric layer 630, the piezoelectric element 600 will vibrate. If the frequency of vibration of the piezoelectric element 600 is within the range of frequencies audible to the human ear, the piezoelectric element 600 can act as a speaker or buzzer. The diaphragm 640 can amplify the sound generated by the piezoelectric element 600 by enabling the movement of a greater volume of air. In some embodiments, the piezoelectric element 600 can be a low-profile MEMS or NEMS (nanoelectromechanical systems) piezoelectric element and the piezoelectric layer 630 can comprise any piezoelectric material capable of being deposited in thin films such as zirconate titanate (PZT) or lead magnesium niobite-lead titanate (PMN-PT). In other embodiments, piezoelectric layer 630 can comprise any type of piezoelectric material, a combination of piezoelectric materials, or combinations of one or more piezoelectric materials with one or more non-piezoelectric materials.

In some embodiments, piezoelectric elements can have more layers than shown in piezoelectric element 600. A piezoelectric element can have intervening layers between the electrodes and a piezoelectric layer and the electrodes and the diaphragm. Piezoelectric elements can have diaphragms of different sizes, shapes and can comprise multiple layers to create acoustic waves with desired characteristics. In some embodiments, resonators can be used to amplify the vibration of a piezoelectric element. In some embodiments, a piezoelectric element does not contain a diaphragm or any other component that amplifies the vibration of the piezoelectric layer or translates the vibration of the piezoelectric layer to another frequency. In embodiments where the piezoelectric element is attached to the body or a component of a device, the vibration of the piezoelectric element can cause the device to vibrate enough to be felt by a user.

Figure 7A:
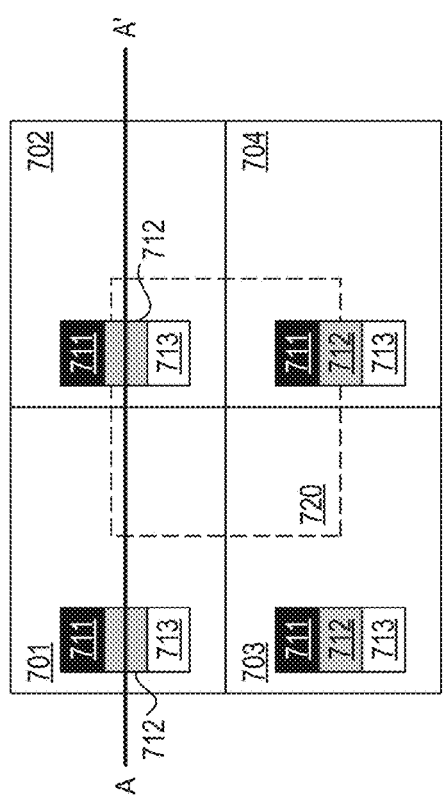
FIG. 7A illustrates a set of exemplary pixels with an integrated piezoelectric element located on the back side of a display substrate.

FIG. 7A illustrates a set of exemplary pixels with a piezoelectric element located on the back side of a display substrate. Micro-LED pixels 701-704 each have a red display element 711, a green display element 712, and a blue display element 713. A piezoelectric element 720 is located on the back side of the display substrate and behind the pixels 701-704. As the piezoelectric element 720 is located on the back side of the display substrate, its placement is not constrained by the location of pixel display elements 711-713. In some embodiments, piezoelectric elements mounted on the back side of the display substrate have a minimum physical dimension of 0.5 mm.

Figure 7B:
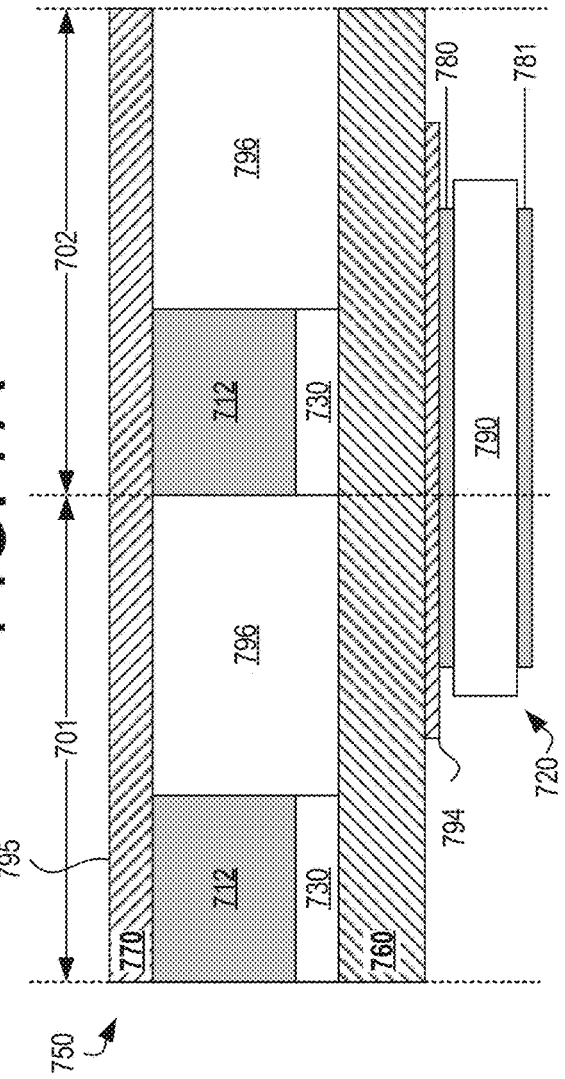
FIG. 7B illustrates a cross-section of the exemplary pixels of FIG. 7A taken along the line A-A'.

FIG. 7B illustrates a cross-section of the exemplary pixels of FIG. 7A taken along the line A-A'. Cross-section 750 illustrates the cross section of pixels 701-702. The red display elements 712 and corresponding electrodes 730 for the pixels 701 and 702 are located on a display substrate 760. The pixels 701-702 are covered by a transparent display medium 770, which, in some embodiments, can comprise a touchscreen. The piezoelectric element 720 comprises electrodes 780 and 781 on either side of a piezoelectric layer 790 with diaphragm 794 positioned between the electrode 780 and the display substrate 760. Although piezoelectric element 720 is shown as spanning over only a few pixels, a piezoelectric element located on the back of a display substrate can span over more than a few pixels. The number and size of piezoelectric elements incorporated into a display area can depend on, for example, whether a coarse or fine level of localized haptic feedback is desired. For example, in a dual-display laptop, piezoelectric elements can span the number of pixels across which a key of a virtual keyboard is to be rendered. In another example, a large number of closely spaced smaller piezoelectric elements can be incorporated into a display to provide a more granular localized haptic response as part of an operating system, a video game, or another context in which haptic feedback may be desired at a precise location.

A system comprising piezoelectric elements integrated into a display can provide a localized haptic response by determining the location of a touch to the display and causing one or more piezoelectric elements located at or in the vicinity of the touch location to vibrate. Localized haptic feedback can be provided by the piezoelectric element 750 to a user through application of an alternating voltage differential to the electrodes 780 and 781, which causes the piezoelectric layer 790 to vibrate, which in turn causes vibration of the diaphragm 794, which in turn causes the display to vibrate in the vicinity of the piezoelectric element 720. This haptic response can be provided before the finger, stylus or other object touching the display is removed from the display. In some embodiments, multiple piezoelectric elements located in the vicinity of the touch location can be simultaneously activated to provide for stronger haptic feedback to a user.

In some embodiments, circuitry to drive a piezoelectric element is located adjacent to or within the vicinity of the piezoelectric elements. In other embodiments, the circuitry driving individual piezoelectric elements is centralized but still located within the display. In yet other embodiments, the circuitry driving piezoelectric elements is located external to the display.

Piezoelectric elements can be integrated on the front side of the display substrate in embodiments where there is enough space to accommodate piezoelectric elements in the black matrix area. In these embodiments, the piezoelectric elements are arranged with one of the electrodes positioned adjacent to the front side of the display substrate and with the diaphragm adjacent to the other electrode. The transparent display medium in a region above a piezoelectric element can have holes to allow for acoustic waves generated by the piezoelectric element to be transmitted to the environment without having to be transmitted through the transparent display medium layers. Piezoelectric elements located on the back side of the display substrate can also be used as speakers to deliver audio to the front of the display. Rear-facing piezoelectric elements can also be used as microphones. Mechanical energy in the form of acoustic waves reaching a piezoelectric element can be converted by the piezoelectric element into audio signals that are provided to audio processing components incorporated into the display. Audio signals provided by piezoelectric elements to audio processing components can be processed in any manner described herein with reference to audio signals provided by microphones and display-integrated piezoelectric elements can be employed in any manner described herein with reference to how displayed-integrated microphones can be employed.

Piezoelectric elements can be used as speakers as well as for providing localized haptic feedback. For example, with reference to piezoelectric element 720, the vibrations of the diaphragm 794 can propagate through the display substrate 760, through the air gaps 796 between the front side of the display substrate and the transparent display medium, through the transparent display medium, and into the environment in front of the display. In other embodiments, a piezoelectric element acting as a rear-facing speaker could have the structure of piezoelectric element 720 but with a second diaphragm located adjacent to the electrode located further away from the display substrate. In yet other embodiments, a piezoelectric element acting as a rear-facing speaker could have the structure of piezoelectric element 720 but with a single diaphragm located adjacent to the electrode located further away from the display substrate. The sound generated by piezoelectric elements acting a rear-facing speaker can propagate through vents or other openings in the back of the display housing or by propagation through the display housing.

Piezoelectric elements distributed across a display can allow for the creation of local sound effects. For example, a user attempting to select an icon that is not presently selectable could hear a buzz or other noise that emanates from the location of the display where the icon is rendered. In larger displays, sound effects can be created using multiple piezoelectric elements to create stereophonic sound effects.

Figure 8A:
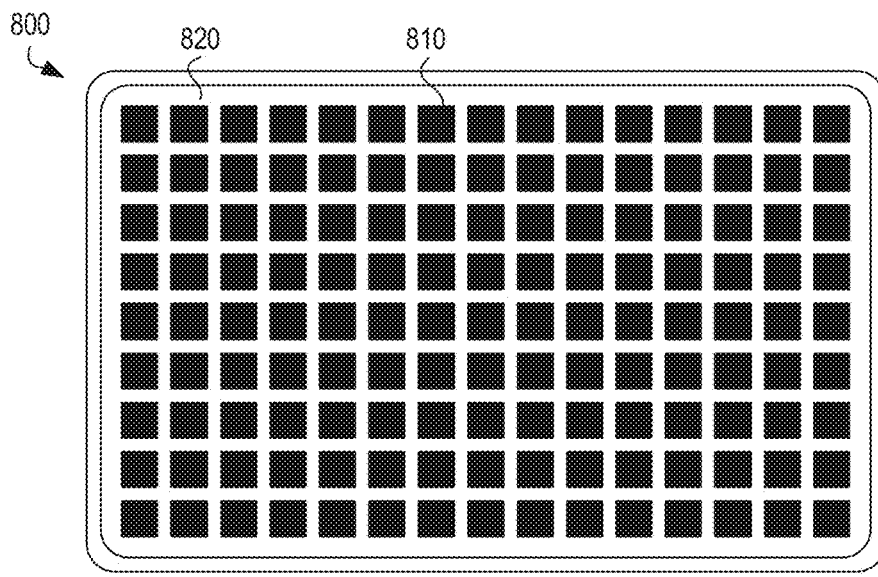
FIGS. 8A-8C illustrate exemplary arrangements of piezoelectric elements in a display.
Figure 8B:
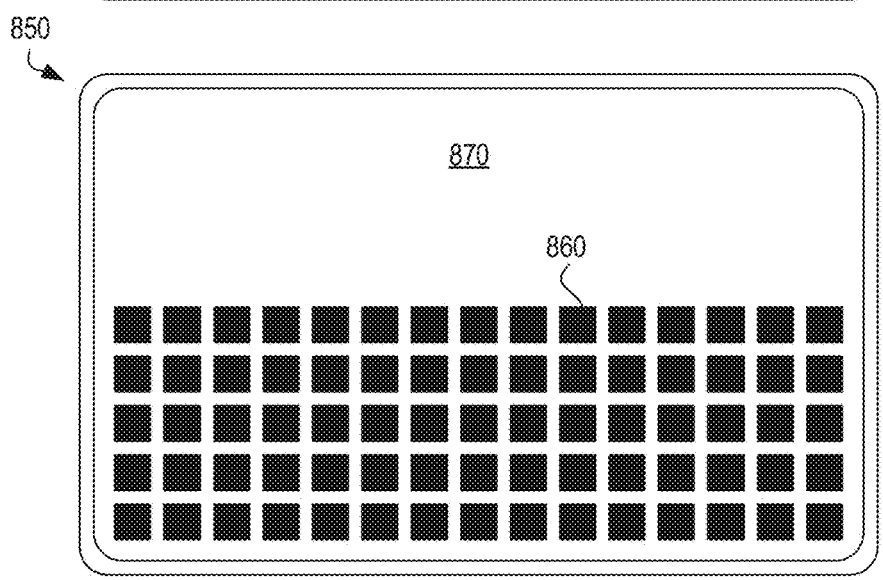
Figure 8C:
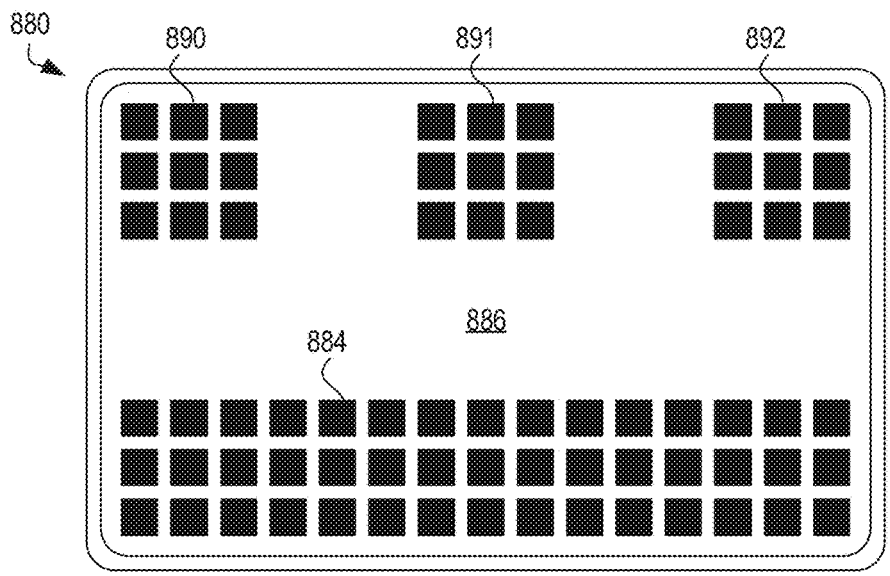

FIGS. 8A-8C illustrate exemplary arrangements of piezoelectric elements in a display. FIG. 8A illustrates a display 800 in which an array of piezoelectric elements 810 are distributed across a display area 820. FIG. 8B illustrates a display 850 in which an array of piezoelectric elements 860 occupy a lower portion of a display area 870. The displays 800 and 850 (as well as any other displays comprising integrated piezoelectric elements as described herein) can be stand-alone displays (e.g., computer monitors in wired or wireless communication with laptops, notebooks, smartphones, tablets), displays integrated into mobile devices (e.g., single- and dual-display laptops or notebooks, tablets, smartphones), embedded displays (e.g., IVI systems, kiosks), or other types of display (e.g., television sets, commercial displays, gaming consoles, point-of-sale (POS) systems).

An arrangement of piezoelectric elements such as illustrated in FIG. 8A can be used where localized haptic feedback is desired across the full extent of a display area. An arrangement of piezoelectric elements such as shown in FIG. 8B can be used where localized haptic feedback may be needed for only a portion of a display area. For example, the display 850 could be the base of a dual-display laptop with the piezoelectric elements 860 located in the portion of the display area 870 in which a virtual keyboard can be rendered, to allow for localized haptic feedback to a user while typing on the virtual keyboard.

Displays integrating piezoelectric elements for providing localized haptic feedback typically also comprise touchscreens that allow for the detection of an object (e.g., finger, stylus) touching the display surface (e.g., display surface 795 in FIG. 7B and display surface 475 in FIG. 4B) and determining where the touch has occurred on the display. Existing touchscreen technologies (e.g., resistance-based, capacitance-based) can be used for making displays described herein as touch-enabled. Some existing touchscreen technologies comprise multiple layers that reside on a glass display substrate and others are integrated into a display substrate (such as in AMOLED (active matrix OLED) in-cell displays). As used herein, the term "transparent display medium" includes any touchscreen layers, regardless of whether the touchscreen layers are located on top of a display substrate or a display substrate layer is used as part of a touchscreen.

Regardless of the touchscreen technology used, touch information provided by the touchscreen can be used to determine a touch location, the location where a touch has occurred on the display. Touch information can be signals provided by individual touchscreen components (such as a touchscreen sensor) or signals generated by touchscreen (such as a touchscreen controller) components based on the signals provided by the individual touchscreen components. For example, touch information can be analog signals provided by a touchscreen sensor or digital signals provided by a touchscreen controller based on analog signals provided to the controller by the touchscreen sensor. In some embodiments, a touchscreen controller can determine a touch location. In other embodiments, touch information is sent to a processor located external to the display to determine a touch location. One or more piezoelectric elements can be activated at the touch location or in the vicinity of the touch location to provide local haptic feedback to a user.

The placement of piezoelectric elements in displays provides for various haptic feedback use cases. In a first use case, piezoelectric elements can provide local haptic feedback to a user typing on a virtual keyboard rendered on a display. The haptic feedback can be provided in real-time to the user (i.e., while the user is still touching the key). Such localized haptic feedback can provide a user with a virtual keyboarding experience that more closely mimics that of using a physical keyboard. It can also provide confirmation to the user that individual keyboard strokes have been registered. The haptic feedback can be of fixed duration or it can last as long as the user is touching a key.

In some embodiments, touch information provided by a touchscreen can be used to determine a touch strength indicating the amount of force being applied to the display surface during a touch event and a piezoelectric element can be activated to vibrate with an amplitude based on the touch strength. For example, if a user typing on a virtual keyboard rendered on a display comprising a touchscreen capable of providing an indication of how much force is being applied by an object to the display, the magnitude of the haptic feedback provided to the user can be based on how hard the user taps each virtual key. That is, a harder keystroke results in a stronger haptic response and a softer keystroke results in a weaker haptic response. In other embodiments, a stronger haptic feedback response is provided by activating multiple piezoelectric elements.

In some embodiments, the piezoelectric elements can provide touch information to determine a touch location. Touch information can be signals provided by individual piezoelectric elements or signals generated by a processor (located either in the display or external to the display) based on the signals provided by the individual piezoelectric elements. For example, touch information can be analog signals provided by a piezoelectric element or digital signals provided by a processor based on analog signals provided to the controller by a piezoelectric element.

The touch information provided piezoelectric elements can also provide touch strength information. For example, piezoelectric elements located on the back side of a display substrate can be subjected to pressure resulting from a user touching, grabbing, or otherwise manipulating a display or a device incorporating a display with integrated piezoelectric elements. The magnitude of the electrical response generated by a piezoelectric element in response to being subjected to mechanical energy can represent the touch strength. Touch strength information provided by piezoelectric elements can be used in a variety of applications. For example, touch strength can be used by a device to determine which among various touches to the display or device the device should act upon. For example, if a user is holding a tablet with two hands and all four fingers of each hand are in contact with the back of the tablet, all eight fingers could be triggering responses by piezoelectric elements in the tablet. If the user applies more pressure against the back of the table with, for example, the index finger of their left hand to control a game being played, the tablet can determine that the touch made by the left index finger is the input the tablet should act upon because the touch strength of the left index finger touch is the strongest among the various touches. In another example, returning to the virtual keyboard example, a user could be touching multiple virtual keys at the same time while typing on a virtual keyboard, thus causing a response in multiple piezoelectric elements, and the device can register as a key stroke the touch having the strongest touch strength from among the multiple touches.

Other touch strength-based use cases are possible. For example, a device can only register a touch if the electrical signal provided by a piezoelectric element is above a threshold. In another example, all touches are acted upon and the action taken by the device depends on the touch strength. For example, the harder a user strikes the key of a virtual electronic musical keyboard, the louder a sound is played by the device. In another example, the harder a user strikes the key of a virtual keyboard while typing, the stronger the localized haptic feedback response provided by the device.

In a second use case, piezoelectric elements can provide haptic feedback that provides confirmation that a desired action has been registered by the system. For example, a system can confirm to the user that it has registered the touching of an application icon, the copying of selected content, the dropping of a file into an on-screen trash icon, or a myriad of other touch-enabled operations via a localized haptic response.

In some embodiments, piezoelectric elements can be used as speakers. Several piezoelectric elements may need to be ganged together to be able to create enough volume for the elements to collectively operate as a single speaker. A group of piezoelectric elements can generate vibrations in a frequency range that is different from the frequency that can be generated by another group of piezoelectric elements. FIG. 8C illustrates an exemplary arrangement of piezoelectric elements in which sets of piezoelectric elements can act as speakers. The display 880 comprises a set of piezoelectric elements 884 located in a lower region of a display area 886 and piezoelectric element sets 890, 891, and 892 located in the upper-left, upper-center, and upper-right of the display area 886, respectively. The display 880 can be a large flat-panel display in which the piezoelectric element sets 884, 890, 891, and 892 operate as subwoofer, left-front, center, and right-front channels, respectively, of a surround sound system. The number and characteristics of the piezoelectric elements in each set can be tailored to produce sounds in frequency ranges appropriate for their respective roles in a surround sound system. For example, to act as a subwoofer, the piezoelectric element set 884 can have a larger number of elements that are capable of producing sounds in the lower range of frequencies audible to humans and the sets 890, 891, and 892 can have fewer number of piezoelectric elements that are capable of producing sounds in the middle and high range of frequencies audible to humans. In other embodiments, the piezoelectric element set 884 can mimic a sound bar, which is typically positioned just below a television set or display, and have various channel configuration, such as two subsets of piezoelectric elements that act as left and right speakers in a two-channel configuration, three subsets that act as left, center, and right speakers in a three-channel configuration, and five subsets that act as left, center, right and two back channel speakers in a five-channel configuration.

In some embodiments, beamforming techniques can be applied to a set of piezoelectric elements to allow for the directional transmission of sound waves. For example, a system can activate a set of display-integrated piezoelectric elements to direct sound to a determined location external to the display where a user has been determined to be located based on the application of beamforming techniques applied to received audio signals, as described above. The system can activate individual piezoelectric elements within the set such that the amplitude and phase of the audio vibrations generated by the piezoelectric elements constructively interfere at the desired location.

In some embodiments, piezoelectric elements can assist in the thermal management of a display. For example, a display can have thermal sensors integrated into the display area and the display (or a system in which the display is incorporated) can determine that a specific location, region, or the display as a whole has exceeded a thermal threshold based on thermal sensor data provided by the thermal sensors. In response, multiple piezoelectric elements can be activated in a coordinated manner to create one or more acoustic waves internal to the display to move heated air from within the display to the edge of the display where the excess heat can dissipate to the external environment through a vent or other opening in the display housing. The air moved by acoustic waves can be located between the back side of the display substrate and the display housing.

The thermal sensors can be of any number, location, and arrangement in the display area and can be located on either side of the display substrate. The thermal sensors can provide thermal sensor data to a display thermal manager, which can be a processor or any other processing component responsible for display thermal management of the display located within or external to the display. If the display thermal manager detects that the temperature of a specific location or region within the display or the display as a whole has exceeded a threshold temperature, the display thermal manager can activate piezoelectric elements to remove the excess heat. The display thermal manager can activate the piezoelectric elements directly or send a message to another processor in the display or located externally that is responsible for activating the piezoelectric elements. Using piezoelectric elements to aid in display thermal management can also assist in the regulation of the surface temperature of the display due to the proximity of piezoelectric elements to the display surface.

In some embodiments, piezoelectric elements can participate in display thermal management to achieve a more uniform heat distribution in a display, even if no portion of the display is determined to have exceeded thermal limits. Providing a more uniform heat distribution in a display can delay or prevent a location or region of the display from exceeding thermal limits. For example, the system can determine from thermal sensor data that the temperature of a first location of the display exceeds the temperature of a second location or region of the display by a threshold amount. The system can then move heated air away from the first location to achieve a more uniform temperature distribution in the interior of the display. The heated air can be moved by acoustic waves generated by piezoelectric elements to the edge of the display where the excess heat can be dissipated into the external environment or to cooler locations or regions of the display.

In other embodiments, the system can monitor content being displayed and activate piezoelectric elements to move air away from regions of the display where the system determines that displaying the content is expected to heat up the display. For example, a system can determine that video content being displayed in a window rendered on a display is likely to cause thermal limits to be exceeded as the content of the displayed video is continuously changing rapidly (i.e., the pixel display elements are repeatedly being turned on and off at a high rate). Piezoelectric elements can be activated to move air away from the region of the display where the video is being played to prevent or delay overheating.

In other embodiments, the system can analyze content before it is displayed to determine whether displaying the content may cause a region of the display to overheat and activate piezoelectric elements to create one or more acoustic waves to move air away from the region where the content is to be displayed as soon as the content expected to cause overheating begins to be displayed.

Piezoelectric elements can create an acoustic wave by successively activating adjacent rows or columns of piezoelectric elements. The successive activation of piezoelectric element rows or columns can create a pressure wave in the air internal to the display that can move heated air toward a display edge (or wherever there is a vent in the display housing) where it can dissipate into the external environment. If a specific location or small region of the display is overheating, partial rows or partial columns of piezoelectric elements may be activated to move the heated air. If a large region of the display or the display as a whole is overheating, entire rows and columns of piezoelectric elements can be activated to create acoustic waves. In some embodiments, the piezoelectric elements are activated at frequencies inaudible to the human ear when activated to create acoustic waves to relieve overheating.

Thus, devices with piezoelectric elements integrated into a display have advantages over devices that either do not have piezoelectric elements or have one or only a few haptic feedback devices. Some existing mobile devices, such as smartphones, provide haptic feedback through the use of linear or circular haptic motors using magnets and coils. The piezoelectric elements described herein are smaller than such existing approaches. The distribution of multiple (up to many) integrated piezoelectric elements across a display allows for localized haptic feedback not possible in devices with a single haptic feedback device and enables new user experiences, such as providing haptic feedback to a user typing on a virtual keyboard.

Figure 9:
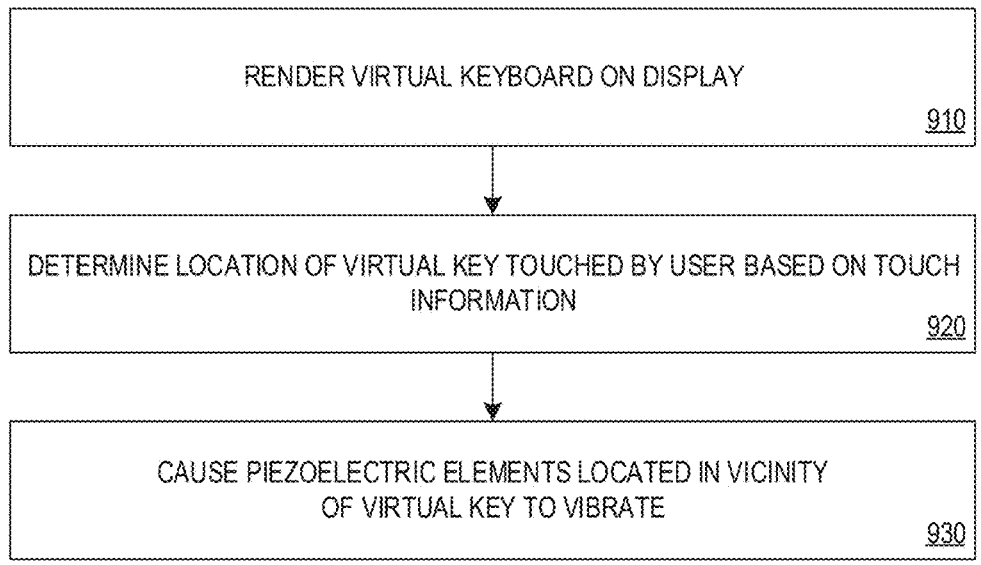
FIG. 9 illustrates an exemplary method for providing localized haptic feedback to a user of a virtual keyboard.

FIG. 9 illustrates an exemplary method for providing localized haptic feedback to a user of a virtual keyboard. The method 900 can be performed, for example, by a dual-display laptop having piezoelectric elements integrated into a touch-enabled display incorporated into the base of the laptop and upon which a virtual keyboard can be rendered. At 910, a virtual keyboard is rendered on the display. In the example, a virtual keyboard is rendered on the display in the laptop base. At 920, the location of a virtual key of the virtual keyboard touched by a user is determined based on touch information provided by the display's touchscreen. In the example, a user touches a key on the virtual keyboard. The location of the touched key is determined based on touch information provided by the touchscreen in the display. At 930, one or more of the piezoelectric elements located in the vicinity of the virtual key location are caused to vibrate. In the example, the system causes the piezoelectric element closest to the location of the touched key to vibrate, providing a localized haptic feedback response to the user. In other embodiments, the method 900 can comprise fewer, alternative, or more actions. For example, in some embodiments, the method 900 can further determine a touch strength based on the touch information and cause the one or more piezoelectric elements located in the vicinity of the touched key to vibrate with an amplitude based at least in part on the touch strength.

Figure 10:
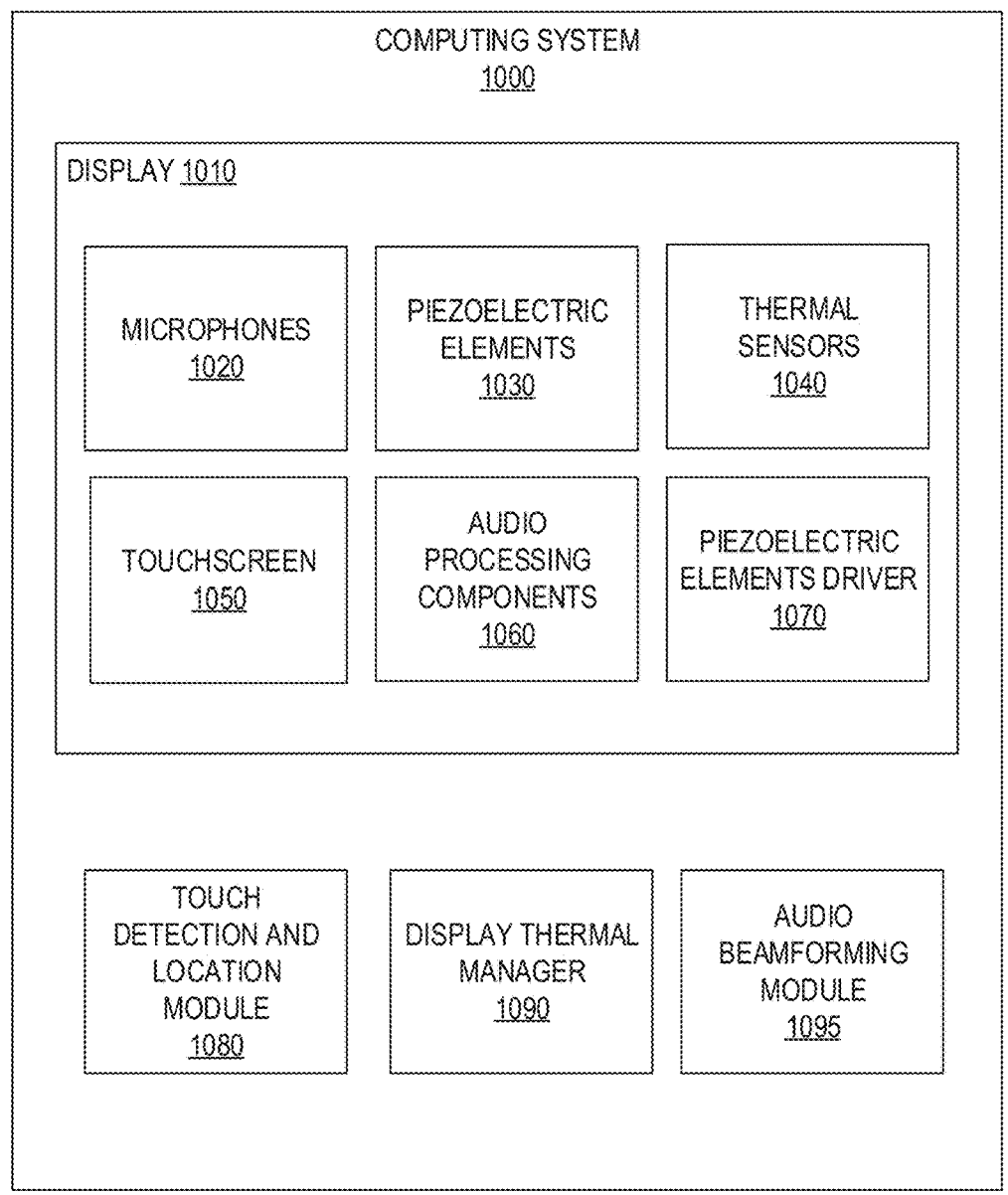
FIG. 10 illustrates an exemplary computing system with sensors integrated into a display.

FIG. 10 illustrates an exemplary computing system with sensors integrated into a display. The system 1000 comprises a display 1010 comprising microphones 1020, piezoelectric elements 1030, thermal sensors 1040, touchscreen 1050, audio processing components 1060, and piezoelectric elements driver 1070 or combinations thereof. The microphones 1020, piezoelectric elements 1030, thermal sensors 1040, and touchscreen 1050 are located in the display area of the display 1010 and can be of any type of microphone, piezoelectric element, thermal sensor, or touchscreen described or referenced herein. The audio processing components 1060 are also located in the display area and can comprise one or more of the audio processing components described or referenced herein (audio codecs, DSPs, etc.). The piezoelectric elements driver 1070 is also located in the display area and selectively activates the piezoelectric elements 1030 to cause a localized haptic response at the display. The piezoelectric elements driver 1070 can also create a non-localized haptic response using the piezoelectric elements 1030. That is, even though the piezoelectric elements 1030 are located at specific locations within the display area, the piezoelectric elements driver 1070 can activate one or more of the piezoelectric elements 1030 to provide haptic feedback that is independent of the location of a touch event. In some embodiments, a piezoelectric elements driver can be located external to the display.

The system 1000 further comprises touch detection and location module 1080, display thermal manager 1090, and audio beamforming module 1095 located external to the display 1010. The touch detection and location module 1080 can determine that the surface of the display has been touched and the location of the touch on the display. The display thermal manager 1090 can determine whether a location, region, or the display as a whole exhibit overheating and causes piezoelectric elements driver 1070 to activate the piezoelectric elements 1030 to create acoustic waves in the display. The audio beamforming module 1095 can apply beamforming or spatial filtering techniques to enhance audio detection capabilities of the display 1010 in a specific direction using one or more of the microphones 1020 or to direct sound to a specific location external to the display 1010 using one or more of the piezoelectric elements 1030. The integration of microphones and piezoelectric elements into a single display can allow for beamforming of audio signals received by (via the microphones) and transmitted to (via the piezoelectric elements) a remote audio source. For example, a laptop with an open lid can use beamforming techniques to improve audio detection of words spoken by someone located across the room from the laptop and use beamforming techniques to direct sound effects, voice, music, or other audio content generated at the display toward that person. In other embodiments, any of the modules 1080 and 1095 and display thermal manager 1090 or combinations thereof can be located in the display 1010. The computing system 1000 can further comprise one or more computer-readable media that stores instructions to cause the audio processor components 1060, the piezoelectric elements driver 1070, the touch detection and location module 1080, the display thermal manager 1090, or the audio beamforming module 1095 to carry out their functionalities. These computer-readable media can be located in and/or external to the display 1010.

Although the system 1000 comprises various types of sensors—microphones, piezoelectric elements, a touchscreen, and thermal sensors—integrated into a display, displays in other embodiments can have fewer integrated sensors. For example, a first display can have just microphone sensors, a second display can have piezoelectric elements and a touchscreen, and a third display can have piezoelectric elements, a touchscreen, and thermal sensors.

FIG. 10 illustrates one example of a set of modules that can be included in a computing system or device. In other embodiments, a computing system or device can have more or fewer modules than those shown in FIG. 10. Moreover, separate modules can be combined into a single module, and a single module can be split into multiple modules. Further, any of the modules shown in FIG. 10 can be part of the operating system of the computing system 1000, one or more software applications independent of the operating system, or operate at another software layer. The modules shown in FIG. 10 can be implemented in software, hardware, firmware or combinations thereof. A computer device or system referred to as being programmed to perform a method can be programmed to perform the method via software, hardware, firmware or combinations thereof.

Although the display 1010 is shown in FIG. 10 as being part of the computing system 1000, any of the displays described or referenced herein can be referred to as a system.

The technologies, techniques, and embodiments described herein can be performed by any of a variety of computing devices, including mobile devices (e.g., smartphones, handheld computers, laptops, notebooks, tablets, media players, portable gaming consoles, cameras), non-mobile devices (e.g., desktop computers, servers, stationary gaming consoles, set-top boxes, televisions) and embedded devices (e.g., devices incorporated into a vehicle, home or place of business). As used herein, the term "computing devices" includes computing systems and includes devices comprising multiple discrete physical components.

Figure 11:
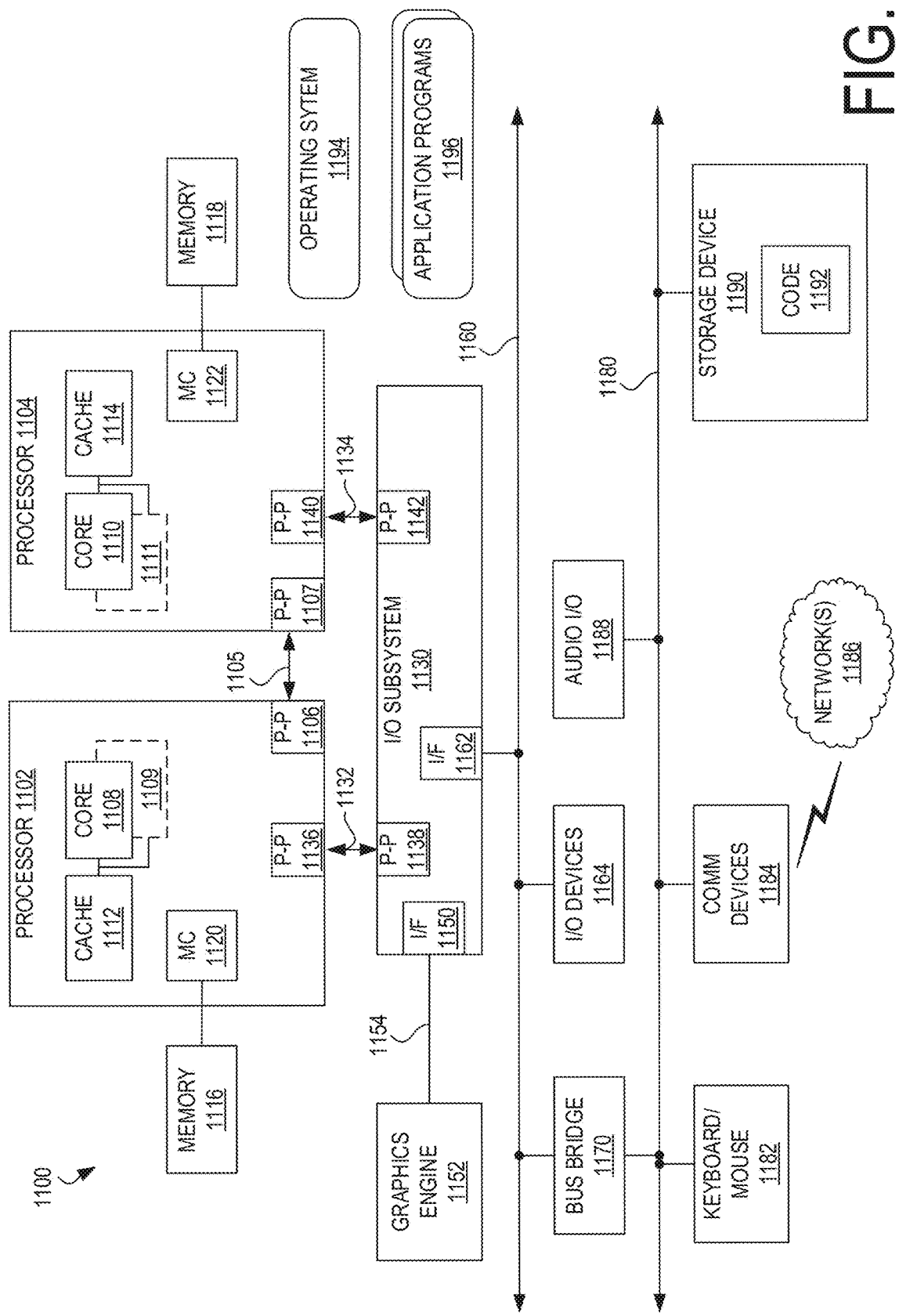
FIG. 11 is a block diagram of an exemplary computing device in which technologies described herein may be implemented.

FIG. 11 is a block diagram of an exemplary computing device in which technologies described herein may be implemented. Generally, components shown in FIG. 11 can communicate with other shown components, although not all connections are shown, for ease of illustration. The device 1100 is a multiprocessor system comprising a first processor 1102 and a second processor 1104 and is illustrated as comprising point-to-point (P-P) interconnects. For example, a point-to-point (P-P) interface 1106 of the processor 1102 is coupled to a point-to-point interface 1107 of the processor 1104 via a point-to-point interconnection 1105. It is to be understood that any or all of the point-to-point interconnects illustrated in FIG. 11 can be alternatively implemented as a multi-drop bus, and that any or all buses illustrated in FIG. 11 could be replaced by point-to-point interconnects.

As shown in FIG. 11, the processors 1102 and 1104 are multicore processors. Processor 1102 comprises processor cores 1108 and 1109, and processor 1104 comprises processor cores 1110 and 1111. Processor cores 1108-1211 can execute computer-executable instructions in a manner similar to that discussed below in connection with FIG. 12, or in other manners.

Processors 1102 and 1104 further comprise at least one shared cache memory 1112 and 1114, respectively. The shared caches 1112 and 1114 can store data (e.g., instructions) utilized by one or more components of the processor, such as the processor cores 1108-1209 and 1110-1211. The shared caches 1112 and 1114 can be part of a memory hierarchy for the device 1100. For example, the shared cache 1112 can locally store data that is also stored in a memory 1116 to allow for faster access to the data by components of the processor 1102. In some embodiments, the shared caches 1112 and 1114 can comprise multiple cache layers, such as level 1 (L1), level 2 (L2), level 3 (L3), level 4 (L4), and/or other caches or cache layers, such as a last level cache (LLC).

Although the device 1100 is shown with two processors, the device 1100 can comprise any number of processors. Further, a processor can comprise any number of processor cores. A processor can take various forms such as a central processing unit, a controller, a graphics processor, an accelerator (such as a graphics accelerator or digital signal processor (DSP)) or a field programmable gate array (FPGA). A processor in a device can be the same as or different from other processors in the device. In some embodiments, the device 1100 can comprise one or more processors that are heterogeneous or asymmetric to a first processor, accelerator, FPGA, or any other processor. There can be a variety of differences between the processing elements in a system in terms of a spectrum of metrics of merit including architectural, microarchitectural, thermal, power consumption characteristics and the like. These differences can effectively manifest themselves as asymmetry and heterogeneity amongst the processors in a system. In some embodiments, the processors 1102 and 1104 reside in the same die package.

Processors 1102 and 1104 further comprise memory controller logic (MC) 1120 and 1122. As shown in FIG. 11, MCs 1120 and 1122 control memories 1116 and 1118 coupled to the processors 1102 and 1104, respectively. The memories 1116 and 1118 can comprise various types of memories, such as volatile memory (e.g., dynamic random access memories (DRAM), static random access memory (SRAM)) or non-volatile memory (e.g., flash memory). While MCs 1120 and 1122 are illustrated as being integrated into the processors 1102 and 1104, in alternative embodiments, the MCs can be logic external to a processor and can comprise one or more layers of a memory hierarchy.

Processors 1102 and 1104 are coupled to an Input/Output (I/O) subsystem 1130 via P-P interconnections 1132 and 1134. The point-to-point interconnection 1132 connects a point-to-point interface 1136 of the processor 1102 with a point-to-point interface 1138 of the I/O subsystem 1130, and the point-to-point interconnection 1134 connects a point-to-point interface 1140 of the processor 1104 with a point-to-point interface 1142 of the I/O subsystem 1130. Input/Output subsystem 1130 further includes an interface 1150 to couple I/O subsystem 1130 to a graphics engine 1152, which can be a high-performance graphics engine. The I/O subsystem 1130 and the graphics engine 1152 are coupled via a bus 1154. Alternately, the bus 1154 could be a point-to-point interconnection.

Input/Output subsystem 1130 is further coupled to a first bus 1160 via an interface 1162. The first bus 1160 can be a Peripheral Component Interconnect (PCI) bus, a PCI Express bus, another third generation I/O interconnection bus or any other type of bus.

Various I/O devices 1164 can be coupled to the first bus 1160. A bus bridge 1170 can couple the first bus 1160 to a second bus 1180. In some embodiments, the second bus 1180 can be a low pin count (LPC) bus. Various devices can be coupled to the second bus 1180 including, for example, a keyboard/mouse 1182, audio I/O devices 1188 and a storage device 1190, such as a hard disk drive, solid-state drive or other storage devices for storing computer-executable instructions (code) 1192. The code 1192 can comprise computer-executable instructions for performing technologies described herein. Additional components that can be coupled to the second bus 1180 include communication device(s) 1184, which can provide for communication between the device 1100 and one or more wired or wireless networks 1186 (e.g. Wi-Fi, cellular or satellite networks) via one or more wired or wireless communication links (e.g., wire, cable, Ethernet connection, radio-frequency (RF) channel, infrared channel, Wi-Fi channel) using one or more communication standards (e.g., IEEE 802.11 standard and its supplements).

The device 1100 can comprise removable memory such as flash memory cards (e.g., SD (Secure Digital) cards), memory sticks, Subscriber Identity Module (SIM) cards). The memory in device 1100 (including caches 1112 and 1114, memories 1116 and 1118 and storage device 1190) can store data and/or computer-executable instructions for executing an operating system 1194 and application programs 1196. Example data includes web pages, text messages, images, sound files, video data, biometric thresholds for particular users or other data sets to be sent to and/or received from one or more network servers or other devices by the device 1100 via one or more wired or wireless networks, or for use by the device 1100. The device 1100 can also have access to external memory (not shown) such as external hard drives or cloud-based storage.

The operating system 1194 can control the allocation and usage of the components illustrated in FIG. 11 and support one or more application programs 1196. The application programs 1196 can include common mobile computing device applications (e.g., email applications, calendars, contact managers, web browsers, messaging applications) as well as other computing applications and utilities, such as a virtual keyboard.

The device 1100 can support various input devices, such as a touchscreen, microphones, camera, physical keyboard, virtual keyboard, proximity sensor and trackball, and one or more output devices, such as a speaker and a display. Other possible input and output devices include piezoelectric and other haptic I/O devices. Any of the input or output devices can be internal to, external to or removably attachable with the device 1100. External input and output devices can communicate with the device 1100 via wired or wireless connections.

In addition, the computing device 1100 can provide one or more natural user interfaces (NUIs). For example, the operating system 1194 or applications 1196 can comprise speech recognition logic as part of a voice user interface that allows a user to operate the device 1100 via voice commands. Further, the device 1100 can comprise input devices and logic that allows a user to interact with the device 1100 via a body, hand or face gestures. For example, a user's hand gestures can be detected and interpreted to provide input to a gaming application.

The device 1100 can further comprise one or more communication components 1184. The components 1184 can comprise wireless communication components coupled to one or more antennas to support communication between the device 1100 and external devices. The wireless communication components can support various wireless communication protocols and technologies such as Near Field Communication (NFC), Wi-Fi, Bluetooth, 4G Long Term Evolution (LTE), Code Division Multiplexing Access (CDMA), Universal Mobile Telecommunication System (UMTS) and Global System for Mobile Telecommunication (GSM). In addition, the wireless modems can support communication with one or more cellular networks for data and voice communications within a single cellular network, between cellular networks, or between the mobile computing device and a public switched telephone network (PSTN).

The device 1100 can further include at least one input/output port (which can be, for example, a USB, IEEE 1394 (FireWire), Ethernet and/or RS-232 port) comprising physical connectors; a power supply; a satellite navigation system receiver, such as a GPS receiver; a gyroscope; an accelerometer; a proximity sensor; and a compass. A GPS receiver can be coupled to a GPS antenna. The device 1100 can further include one or more additional antennas coupled to one or more additional receivers, transmitters and/or transceivers to enable additional functions.

It is to be understood that FIG. 11 illustrates only one exemplary computing device architecture. Computing devices based on alternative architectures can be used to implement technologies described herein. For example, instead of the processors 1102 and 1104, and the graphics engine 1152 being located on discrete integrated circuits, a computing device can comprise an SoC (system-on-a-chip) integrated circuit incorporating multiple processors, a graphics engine and additional components. Further, a computing device can connect elements via bus or point-to-point configurations different from that shown in FIG. 11. Moreover, the illustrated components in FIG. 11 are not required or all-inclusive, as shown components can be removed and other components added in alternative embodiments.

Figure 12:
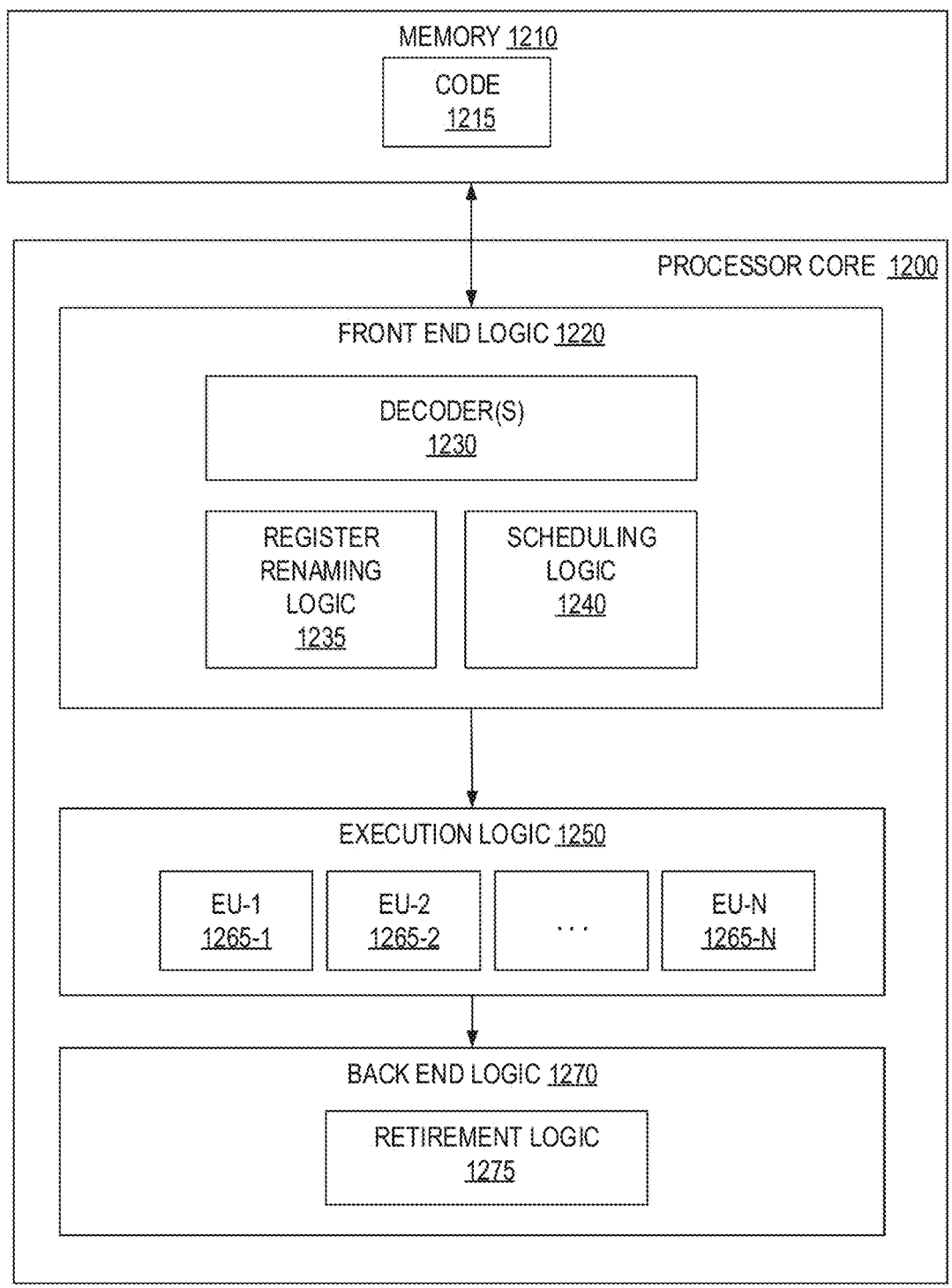
FIG. 12 is a block diagram of an exemplary processor core that can execute instructions as part of implementing technologies described herein.

FIG. 12 is a block diagram of an exemplary processor core 1200 to execute computer-executable instructions as part of implementing technologies described herein. The processor core 1200 can be a core for any type of processor, such as a microprocessor, an embedded processor, a digital signal processor (DSP) or a network processor. The processor core 1200 can be a single-threaded core or a multi-threaded core in that it may include more than one hardware thread context (or "logical processor") per core.

FIG. 12 also illustrates a memory 1210 coupled to the processor 1200. The memory 1210 can be any memory described herein or any other memory known to those of skill in the art. The memory 1210 can store computer-executable instruction 1215 (code) executable by the processor core 1200.

The processor core comprises front-end logic 1220 that receives instructions from the memory 1210. An instruction can be processed by one or more decoders 1230. The decoder 1230 can generate as its output a micro operation such as a fixed width micro operation in a predefined format, or generate other instructions, microinstructions, or control signals, which reflect the original code instruction. The front-end logic 1220 further comprises register renaming logic 1235 and scheduling logic 1240, which generally allocate resources and queues operations corresponding to converting an instruction for execution.

The processor core 1200 further comprises execution logic 1250, which comprises one or more execution units (EUs) 1265-1 through 1265-N. Some processor core embodiments can include a number of execution units dedicated to specific functions or sets of functions. Other embodiments can include only one execution unit or one execution unit that can perform a particular function. The execution logic 1250 performs the operations specified by code instructions. After completion of execution of the operations specified by the code instructions, back-end logic 1270 retires instructions using retirement logic 1275. In some embodiments, the processor core 1200 allows out of order execution but requires in-order retirement of instructions. Retirement logic 1270 can take a variety of forms as known to those of skill in the art (e.g., re-order buffers or the like).

The processor core 1200 is transformed during execution of instructions, at least in terms of the output generated by the decoder 1230, hardware registers and tables utilized by the register renaming logic 1235, and any registers (not shown) modified by the execution logic 1250. Although not illustrated in FIG. 12, a processor can include other elements on an integrated chip with the processor core 1200. For example, a processor may include additional elements such as memory control logic, one or more graphics engines, I/O control logic and/or one or more caches.

As used in any embodiment herein, the term "module" refers to logic that may be implemented in a hardware component or device, software or firmware running on a processor, or a combination thereof, to perform one or more operations consistent with the present disclosure. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. As used in any embodiment herein, the term "circuitry" can comprise, for example, singly or in any combination, hardwired circuitry, programmable circuitry such as computer processors comprising one or more individual instruction processing cores, state machine circuitry, and/or firmware that stores instructions executed by programmable circuitry. Modules described herein may, collectively or individually, be embodied as circuitry that forms a part of one or more devices. Thus, any of the modules can be implemented as circuitry, such as continuous itemset generation circuitry, entropy-based discretization circuitry, etc. A computer device referred to as being programmed to perform a method can be programmed to perform the method via software, hardware, firmware or combinations thereof.

Any of the disclosed methods can be implemented as computer-executable instructions or a computer program product. Such instructions can cause a computer or one or more processors capable of executing computer-executable instructions to perform any of the disclosed methods. Generally, as used herein, the term "computer" refers to any computing device or system described or mentioned herein, or any other computing device. Thus, the term "computer-executable instruction" refers to instructions that can be executed by any computing device described or mentioned herein, or any other computing device.

The computer-executable instructions or computer program products, as well as any data created and used during implementation of the disclosed technologies, can be stored on one or more tangible or non-transitory computer-readable storage media, such as optical media discs (e.g., DVDs, CDs), volatile memory components (e.g., DRAM, SRAM), or non-volatile memory components (e.g., flash memory, solid state drives, chalcogenide-based phase-change non-volatile memories). Computer-readable storage media can be contained in computer-readable storage devices such as solid-state drives, USB flash drives, and memory modules. Alternatively, the computer-executable instructions may be performed by specific hardware components that contain hardwired logic for performing all or a portion of disclosed methods, or by any combination of computer-readable storage media and hardware components.

The computer-executable instructions can be part of, for example, a dedicated software application or a software application that is accessed via a web browser or other software application (such as a remote computing application). Such software can be read and executed by, for example, a single computing device or in a network environment using one or more networked computers. Further, it is to be understood that the disclosed technology is not limited to any specific computer language or program. For instance, the disclosed technologies can be implemented by software written in C++, Java, Perl, JavaScript, Adobe Flash, or any other suitable programming language. Likewise, the disclosed technologies are not limited to any particular computer or type of hardware.

Furthermore, any of the software-based embodiments (comprising, for example, computer-executable instructions for causing a computer to perform any of the disclosed methods) can be uploaded, downloaded or remotely accessed in a variety of manners. For example, such instructions can be uploaded, downloaded or remotely accessed using the Internet, the World Wide Web, an intranet, cable (including fiber optic cable), magnetic communications, electromagnetic communications (including RF, microwave, and infrared communications), and electronic communications.

As used in this application and in the claims, a list of items joined by the term "and/or" can mean any combination of the listed items. For example, the phrase "A, B and/or C" can mean A; B; C; A and B; A and C; B and C; or A, B and C.

As used in this application and in the claims, a list of items joined by the term "at least one of" can mean any combination of the listed terms. For example, the phrase "at least one of A, B or C" can mean A; B; C; A and B; A and C; B and C; or A, B, and C.

The disclosed methods, apparatuses and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a display comprising: a display substrate comprising a front side; a plurality of pixels located on the front side of the display substrate, the plurality of pixels defining a display area; and a plurality of microphones located on the front side of the display substrate.

Example 2 is the display of Example 1, wherein the plurality of microphones are located within the display area.

Example 3 is the display of Example 2, wherein the microphones are located within a peripheral region of the display area.

Example 4 is the display of Example 2, wherein individual of the pixels occupy a pixel area and at least one of the microphones is located within a pixel area of one of the pixels.

Example 5 is the display of Example 2, wherein at least one of the microphones spans multiple pixels.

Example 6 is the display of Example 2, wherein the display further comprises one or more audio processing components electrically coupled to the microphones.

Example 7 is the display of Example 6, wherein the one or more audio processing components comprise one or more analog-to-digital converters.

Example 8 is the display of Example 6, wherein the one or more audio processing components comprise one or more digital signal processors.

Example 9 is the display of Example 6, wherein the audio processing components are capable of performing at least one of voice activity detection, key phrase detection, or audio speech recognition.

Example 10 is the display of Example 2, wherein the display further comprises one or more audio processing components to: determine a location of an audio source based at least in part on audio signals corresponding to at least one of the microphones; select a subset of the plurality of microphones based on the location of the audio source; and utilize audio signals corresponding to the subset of microphones to enhance detection of sound received at the display from the audio source.

Example 11 is the display of Example 10, the instructions to further cause the one or more processors to power off the microphones not included in the subset of microphones.

Example 12 is the display of Example 1, wherein the display substrate further comprises a back side and a plurality of rear microphones located on the back side of the display.

Example 13 is the display of Example 12, the display further comprising one or more audio processing components to: determine a location of an audio source based at least in part on audio signals corresponding to at least one of the rear microphones; select a subset of the plurality of the rear microphones based on the location of the audio source; and utilize audio signals corresponding to the subset of rear microphones to enhance detection of sound received at the display from the audio source.

Example 14 is the display of Example 13, wherein the display is housed in a closeable computing device and the one or more audio processing components are further to determine the location of the audio source location based at least in part on the audio signals corresponding to the at least one of the rear microphones, select the subset of the plurality of the rear microphones based on the location of the audio source, and utilize the audio signals corresponding to the subset of rear microphones to enhance detection of the sound received at the display from the audio source when the computing device is closed.

Example 15 is the display of Example 1, wherein the plurality of pixels are micro-LED pixels.

Example 16 is the display of Example 1, wherein the plurality of pixels are organic LED pixels.

Example 17 is the display of Example 1, wherein the display is incorporated in a housing that further houses one or more processors and one or more computer-readable media.

Example 18 is the display of Example 1, wherein the display is incorporated in a first housing coupled to a second housing that houses one or more processors and one or more computer-readable media.

Example 19 is the display of Example 1, further comprising a bezel, wherein at least one of the plurality of microphones is located within the bezel.

Example 20 is a method comprising: determining a location of an audio source external to a display based at least in part on audio signals corresponding to at least one of a plurality of microphones incorporated into the display and located within a display area of the display; selecting a subset of the plurality of microphones based on the location of the audio source; and utilizing audio signals corresponding to the subset of microphones to enhance detection of sound received at the display from the audio source.

Example 21 is the method of claim 20, wherein the plurality of microphones are front-facing microphones.

Example 22 is the method of claim 20, wherein the plurality of microphones are rear-facing microphones.

Example 23 is the method of claim 22, wherein the display is housed in a closeable computing device and the determining the location of the audio source, the selecting the subset of the plurality of microphones, and the utilizing the audio signals are performed when the computing device is closed.

Example 24 is the method of claim 20, the method further comprising powering off the microphones not included in the subset of microphones.

Example 25 is a method comprising: performing key phrase detection by one or more audio processing components located within a display area of a display based at least in part on audio signals corresponding to a plurality of microphones incorporated in the display and located within the display area; and causing a processor external to the display to transition from a low-power state to an active state in response to the one or more audio processing components detecting a key phrase.

Example 26 is one or more computer-readable storage media storing computer-executable instructions for causing a computer to perform any of the methods of Examples 18-23.

Example 27 is a system comprising: a touchscreen comprising a display surface; a display substrate comprising a front side and a back side; a plurality of pixels located on the front side of the display substrate; and a plurality of piezoelectric elements located on the back side of the display substrate.

Example 28 is the system of Example 27, further comprising a piezoelectric elements driver to cause one or more of the piezoelectric elements to vibrate.

Example 29 is the system of Example 27, further comprising: at least one processor; and one or more computer readable media comprising instructions stored thereon that when executed causes the at least one processor to: determine a touch location on the display based at least in part on touch information provided by the touchscreen; and cause one or more of the piezoelectric elements located in a vicinity of the touch location to vibrate.

Example 30 is the system of Example 29, wherein the one or more computer readable media comprising instructions stored thereon that when executed cause the at least one processor further to determine a touch strength based at least in part on the touch information, wherein the processor causes the one or more piezoelectric elements located in the vicinity of the touch location to vibrate with an amplitude based at least in part on the touch strength.

Example 31 is the system of Example 27, further comprising: at least one processor; and one or more computer readable media comprising instructions stored thereon that when executed causes the at least one processor to: determine a touch location on the display based at least in part on touch information provided by one or more of the piezoelectric elements; and cause at least one of the piezoelectric elements located in a vicinity of the touch location to vibrate.

Example 32 is the system of Example 31, wherein the one or more computer readable media comprising instructions stored thereon that when executed cause the at least one processor further to determine a touch strength based at least in part on touch strength information provided by the one or more piezoelectric elements, wherein the processor causes the at least one piezoelectric elements located in the vicinity of the touch location to vibrate with an amplitude based at least in part on the touch strength.

Example 33 is the system of Example 27, further comprising: at least one processor; and one or more computer readable media comprising instructions stored thereon that when executed causes the at least one processor to: render a virtual keyboard on the display; determine, based at least in part on touch information provided by the touchscreen, the location of a virtual key of the virtual keyboard touched by a user; and cause one or more of the piezoelectric elements located in a vicinity of the virtual key location to vibrate.

Example 34 is the system of Example 27, further comprising: at least one processor; and one or more computer readable media comprising instructions stored thereon that when executed causes the at least one processor to: determine a location external to the display at which acoustic vibrations generated by one or more of the piezoelectric elements are to be directed; and cause the one or more piezoelectric elements to generate acoustic vibrations that constructively interfere at the determined location.

Example 35 is the system of Example 27, wherein at least one of the piezoelectric elements comprises a metal plate.

Example 36 is the system of Example 27, wherein one or more of the piezoelectric elements are located in a lower region of the display and are capable of vibrating in a lower range of frequencies audible to humans.

Example 37 is the system of Example 27, wherein piezoelectric elements in a first group of the piezoelectric elements can generate vibrations within a first frequency range and piezoelectric elements in a second group of the piezoelectric elements can generate vibrations within a second frequency range, the first frequency range being different than the second frequency range.

Example 38 is the system of Example 27, further comprising: one or more thermal sensors; at least one processor; and one or more computer readable media comprising instructions stored thereon that when executed causes the at least one processor to: determine that the temperature at a location in the display exceeds a temperature threshold based at least on thermal sensor data provided by the one or more thermal sensors; and cause one or more of the piezoelectric elements to generate at least one acoustic wave to move air in the display away from the location in the display that exceeds the temperature threshold.

Example 39 is the system of Example 38, wherein at least one of the thermal sensors are located on the front side of the display substrate.

Example 40 is the system of Example 27, further comprising: one or more thermal sensors; at least one processor; and one or more computer readable media comprising instructions stored thereon that when executed causes the at least one processor to: determine that the temperature at a first location in the display exceeds the temperature of a second location of the display based on thermal sensor data provided by the one or more thermal sensors; and cause one or more of the piezoelectric elements to generate one or more acoustic waves to move air in the display away from the first location in the display.

Example 41 is the system of Example 27, further comprising: a processor; one or more computer-readable media; and a housing that houses the processor, the one or more computer-readable media, and the display.

Example 42 is the system of Example 27, further comprising: a processor; one or more computer-readable media; a first housing that houses the processor and the one or more computer-readable media; and a second housing that houses the display.

Example 43 is a system comprising: a touchscreen comprising a display surface; a display substrate comprising a front side and a back side; a plurality of pixels located on the front side of the display substrate; and a haptic feedback means to provide localized haptic feedback.

Example 44 is the system of Example 43, further comprising: at least one processor; and one or more computer readable media comprising instructions stored thereon that when executed causes the at least one processor to determine a touch location on the display based at least in part on touch information provided by the touchscreen; wherein the haptic feedback means is to provide the localized haptic feedback in a vicinity of the touch location.

Example 45 is the system of Example 44, wherein the one or more computer readable media comprises instructions stored thereon that when executed cause the at least one processor further to determine a touch strength based at least in part on the touch information, wherein the strength of the localized haptic feedback is based at least in part on the touch strength.

Example 46 is a method comprising: determining a touch location on a display comprising a touchscreen, the determining based at least in part on touch information provided by the touchscreen; and causing one or more piezoelectric elements located in a vicinity of the touch location to vibrate, the piezoelectric elements located on the back side of a display substrate of the display.

Example 47 is the method of Example 46, further comprising determining a touch strength based on the touch information, wherein the one or more piezoelectric elements located in the vicinity of the touch location vibrate with an amplitude based at least in part on the touch strength.

Example 48 is the method of Example 46, further comprising: determining that the temperature at a location in the display exceeds a temperature threshold based at least on thermal sensor data provided by one or more thermal sensors incorporated into the display and located within a display area of the display; and causing one or more of the piezoelectric elements to generate at least one acoustic wave to move air in the display away from the location in the display that exceeds the temperature threshold.

Example 49 is the method of Example 46, further comprising: determining that the temperature at a location in the display exceeds a temperature of a second location of the display based at least in part on thermal sensor data provided by one or more thermal sensors incorporated into the display and located within a display area of the display; and causing one or more of the piezoelectric elements to generate at least one acoustic wave to move air in the display away from the first location in the display.

Example 50 is a method comprising: rendering a virtual keyboard on a display comprising a touchscreen; determining, based on touch information provided by the touchscreen, the location of a virtual key of the virtual keyboard touched by a user; and causing one or more of the piezoelectric elements located in a vicinity of the virtual key location to vibrate, the piezoelectric elements located on the back side of a display substrate of display.

Example 51 is one of more computer-readable media having instructions stored thereon that when executed cause one or more processors to perform the method of any of Examples 46-50.

We claim:

1. A display comprising:
a touchscreen comprising a display surface;
a display substrate comprising a front side and a back side;
a plurality of pixels located on the front side of the display substrate;
a plurality of piezoelectric elements located on the back side of the display substrate;
at least one processor; and
one or more computer-readable media comprising instructions stored thereon that when executed cause the at least one processor to:
cause a virtual keyboard to be displayed on the display surface;
determine, based on touch information provided by the touchscreen, a location of a virtual key of the virtual keyboard touched by a user; and
cause one or more piezoelectric elements located in a vicinity of the location of the virtual key to vibrate.

2. The display of claim 1, further comprising a piezoelectric elements driver to cause the one or more piezoelectric elements to vibrate.

3. The display of claim 1, wherein the instructions stored on the one or more computer-readable media further cause the at least one processor to determine a touch strength based on the touch information, wherein the one or more piezoelectric elements located in the vicinity of the location of the virtual key are caused to vibrate with an amplitude based on the touch strength.

4. The display of claim 1, further comprising
a housing that houses the at least one processor, the one or more computer-readable media, and the touchscreen.

5. The display of claim 1, further comprising:
a first housing that houses the at least one processor and the one or more computer-readable media; and
a second housing that houses the touchscreen.

6. The display of claim 5, wherein the first housing and the second housing are part of a closeable computing device.

7. The display of claim 5, wherein at least one of the plurality of piezoelectric elements not in the vicinity of the location of the virtual key are not caused to vibrate.

8. A display comprising:
a touchscreen comprising a display surface;
a display substrate comprising a front side and a back side;
a plurality of pixels located on the front side of the display substrate;
a plurality of piezoelectric elements located on the back side of the display substrate;
one or more thermal sensors;
at least one processor; and
one or more computer-readable media comprising instructions stored thereon that when executed cause the at least one processor to:
determine that a temperature at a location in the display exceeds a temperature threshold based on thermal sensor data provided by the one or more thermal sensors; and
cause one or more piezoelectric elements to generate at least one acoustic wave to move air away from the location in the display that exceeds the temperature threshold.

9. The display of claim 8, further comprising a piezoelectric elements driver to cause the one or more piezoelectric elements to vibrate.

10. The display of claim 8, further comprising a housing that houses the at least one processor, the one or more computer-readable media, and the touchscreen.

11. The display of claim 8, further comprising:
a first housing that houses the at least one processor and the one or more computer-readable media; and
a second housing that houses the touchscreen.

12. The display of claim 11, wherein the first housing and the second housing are part of a closeable computing device.

13. A method comprising:
displaying a virtual keyboard on a display;
determining a touch location on a display comprising a touchscreen, wherein determining is based on touch information provided by the touchscreen, wherein determining the touch location comprises determining a location of a touched virtual key of the virtual keyboard; and causing one or more piezoelectric elements of a plurality of piezoelectric elements located in a vicinity of the touch location to vibrate, the plurality of piezoelectric elements located on a back side of a display substrate of the display, wherein the one or more piezoelectric elements caused to vibrate are located in the vicinity of the touched virtual key.

14. The method of claim 13, further comprising determining a touch strength based on the touch information, wherein the one or more piezoelectric elements located in the vicinity of the touch location are caused to vibrate with an amplitude based on the touch strength.

15. The method of claim 13, wherein at least one of the plurality of piezoelectric elements not in the vicinity of the location of the touched virtual key are not caused to vibrate.

16. A method comprising:

determining a touch location on a display comprising a touchscreen, wherein determining the touch location is based on touch information provided by the touchscreen;

causing one or more piezoelectric elements located in a vicinity of the touch location to vibrate, wherein the one or more piezoelectric elements are part of a plurality of piezoelectric elements located on a back side of a display substrate of the display;

determining that a temperature at a first location in the display exceeds a temperature of a second location of the display based on thermal sensor data provided by one or more thermal sensors incorporated into the display and located within a display area of the display; and causing at least one of the plurality of piezoelectric elements to generate at least one acoustic wave to move air in the display away from the first location in the display.

* * * * *